United States Patent
Geens et al.

(10) Patent No.: US 12,298,577 B2
(45) Date of Patent: May 13, 2025

(54) TELECOMMUNICATIONS ENCLOSURE

(71) Applicant: COMMSCOPE TECHNOLOGIES LLC, Hickory, NC (US)

(72) Inventors: Johan Geens, Bunsbeek (BE); Sai Cheung Lam, Sterrebeck (BE)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 791 days.

(21) Appl. No.: 17/612,518

(22) PCT Filed: May 14, 2020

(86) PCT No.: PCT/US2020/032937
§ 371 (c)(1),
(2) Date: Nov. 18, 2021

(87) PCT Pub. No.: WO2020/236523
PCT Pub. Date: Nov. 26, 2020

(65) Prior Publication Data
US 2022/0214514 A1    Jul. 7, 2022

Related U.S. Application Data

(60) Provisional application No. 62/849,878, filed on May 18, 2019, provisional application No. 62/954,249, filed on Dec. 27, 2019.

(51) Int. Cl.
G02B 6/44     (2006.01)
G02B 6/38     (2006.01)

(52) U.S. Cl.
CPC ......... *G02B 6/4431* (2023.05); *G02B 6/3825* (2013.01); *G02B 6/4447* (2013.01); *G02B 6/4471* (2013.01)

(58) Field of Classification Search
CPC .. G02B 6/4431; G02B 6/3825; G02B 6/4447; G02B 6/4473; G02B 6/4471
See application file for complete search history.

(56) References Cited

U.S. PATENT DOCUMENTS

| | | |
|---|---|---|
| 5,016,952 A | 5/1991 | Arroyo et al. |
| 5,631,993 A | 5/1997 | Cloud et al. |
| 7,120,347 B2 | 10/2006 | Blackwell et al. |

(Continued)

FOREIGN PATENT DOCUMENTS

| | | |
|---|---|---|
| CN | 206610006 U | 11/2017 |
| CN | 207571355 U | 7/2018 |

(Continued)

OTHER PUBLICATIONS

International Search Report and Written Opinion of the International Searching Authority for International Patent Application No. PCT/US2020/032937 mailed Sep. 11, 2020, 12 pages.

(Continued)

*Primary Examiner* — Leslie C Pascal
(74) *Attorney, Agent, or Firm* — MERCHANT & GOULD P.C.

(57) ABSTRACT

The present disclosure relates to a telecommunications enclosure having cable ports and an internal optical tapping or indexing architecture. The cable ports can be defined by hardened fiber optic adapters.

12 Claims, 37 Drawing Sheets

(56) References Cited

U.S. PATENT DOCUMENTS

| | | |
|---|---|---|
| 7,264,402 B2 | 9/2007 | Theuerkorn et al. |
| 7,397,997 B2 | 7/2008 | Mertesdorf et al. |
| 7,665,910 B2 * | 2/2010 | Moore ................ G02B 6/4256 385/88 |
| 7,744,288 B2 | 6/2010 | Lu et al. |
| 7,751,675 B2 | 7/2010 | Holmberg et al. |
| 7,753,596 B2 | 7/2010 | Cox |
| 8,111,966 B2 | 2/2012 | Holmberg et al. |
| 8,213,760 B2 | 7/2012 | Rudenick et al. |
| 8,718,434 B2 | 5/2014 | Gronvall et al. |
| 8,837,894 B2 | 9/2014 | Holmberg et al. |
| 9,557,504 B2 | 1/2017 | Holmberg et al. |
| 2004/0240804 A1 | 12/2004 | Mahapatra et al. |
| 2015/0378112 A1 | 12/2015 | Marcouiller et al. |
| 2017/0045701 A1 | 2/2017 | Diepstraten et al. |

FOREIGN PATENT DOCUMENTS

| | | | |
|---|---|---|---|
| CN | 207694408 U * | 8/2018 | |
| EP | 0 636 909 A1 | 2/1995 | |
| GB | 2198599 A * | 6/1988 | ........... H01R 4/2454 |
| JP | 2003-319528 A | 11/2003 | |
| WO | 2014/190281 A1 | 11/2014 | |
| WO | 2018/044728 A1 | 3/2018 | |
| WO | 2018/231833 A1 | 12/2018 | |

OTHER PUBLICATIONS

Extended European Search Report for Application No. 20808977.1 mailed Jan. 2, 2023.

* cited by examiner

TELECOMMUNICATIONS ENCLOSURE

CROSS-REFERENCE TO RELATED APPLICATIONS

This application is a National Stage Application of PCT/US2020/032937, filed on May 14, 2020, which claims the benefit of U.S. Patent Application Ser. No. 62/849,878, filed on May 18, 2019, and claims the benefit of U.S. Patent Application Ser. No. 62/954,249, filed on Dec. 27, 2019, the disclosures of which are incorporated herein by reference in their entireties. To the extent appropriate, a claim of priority is made to each of the above disclosed applications.

TECHNICAL FIELD

The present disclosure relates generally to telecommunications enclosures. More particularly, the present disclosure relates to telecommunications enclosures including hardened fiber optic connector ports.

BACKGROUND

Telecommunications enclosures, such as multi-service terminals, are commonly used to provide fiber optic connection locations in the field. The telecommunications enclosures often include hardened fiber optic adapter ports adapted for receiving hardened fiber optic connectors. Example telecommunications enclosures including hardened fiber optic adapter ports are disclosed by U.S. Pat. Nos. 7,397,997; 7,120,347; and 7,753,596.

SUMMARY

Certain aspects of the present disclosure relate to telecommunications enclosures for supporting architectures that can initially be installed at relatively low cost, and that can be expanded over time as customer demand increases. In certain examples, enclosures in accordance with the principles of the present disclosure can be used in combination with indexing architectures, wavelength division multiplexing architectures, symmetric passive optical power splitting architectures, and passive asymmetric optical power splitting architectures such as tapping architectures. In certain examples, architectures can support a deferred investment strategy in which components such as multi-service terminals or other terminals can be added to the architecture later in time concurrent with customer demand.

Another aspect of the present disclosure relates to telecommunications enclosures having features that assist in reducing the size and cost of the enclosures. In certain examples, the enclosures can include housings having main in-line body sections and branch sections that are monolithically formed in single pieces to assist in reducing size, regions in need of sealing, and cost. Aspects of the present disclosure also relate to optical fiber and connector management structures adapted for use with relatively small housings. In certain examples, the management structures can include a fiber management portion and a connector mounting portion. In certain examples, the connector mounting portion is movable relative to the fiber management portion between an extended orientation and retracted orientation. The connector mounting portion can be resiliently biased toward the extended orientation. In certain examples, the connector mounting portion can be temporarily retained or latched in the retracted orientation.

Another aspect of the present disclosure relates to a telecommunications enclosure including a housing having a main body section which defines a main axis. The main body section includes a length that extends along the main axis between first and second in-line ends of the housing. The housing also includes a branch section that branches outwardly from the main body section at an intermediate location between the first and second in-line ends of the housing. The branch section defines an offset end of the housing. The telecommunications enclosure also includes a first fiber optic adapter positioned at one of the first and second in-line ends of the housing, a second fiber optic adapter positioned at the offset end of the housing, and a third fiber optic adapter or a cable attachment location positioned at the other of the first and second in-line ends of the housing. Each of the fiber optic adapters includes an outer connector port accessible from outside the housing and an inner connector port facing inside the housing.

A further aspect of the present disclosure relates to a telecommunications enclosure having a configuration that enhances internal access within the enclosure at least during initial manufacturing of the enclosure. The internal access can be used to facilitate fiber routing and general setup of the internal fiber optic architecture of the enclosure. The telecommunications enclosure has a housing including a length that extends along a first axis. The housing also includes a width that extends along a second axis perpendicular to the first axis, and a depth that extends along a third axis that is perpendicular to the first and second axes. The housing includes first and second opposite ends separated by the length and first and second opposite sides separated by the width. The housing also includes a front and a back separated by the depth. A base of the housing includes a rear wall that defines the back of the housing. The base includes first and second end walls that project forwardly from the rear wall and define the first and second ends of the housing. The base includes a front edge defining a front opening of the base. The front edge is defined by the first and second end walls along the width of the housing adjacent the first and second opposite ends of the housing. The front edge extends the length of the housing adjacent the first and second opposite sides of the housing. The front edge defines a first depth dimension with respect to the rear wall at the first and second opposite ends of the housing and defines a second depth dimension with respect to the rear wall at the first and second sides of the housing. The first depth dimension is at least three times as large as the second depth dimension. The telecommunications enclosure also includes a front cover having a rear edge that is bonded to the front edge of the base. The telecommunications enclosure further includes at least one cable port location at each of the first and second opposite ends of the housing.

A variety of additional aspects will be set forth in the description that follows. The aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

The accompanying drawings, which are incorporated in and constitute a part of the description, illustrate certain aspects of the present disclosure. A brief description of the drawings is as follows.

DETAILED DESCRIPTION

Figure 1:
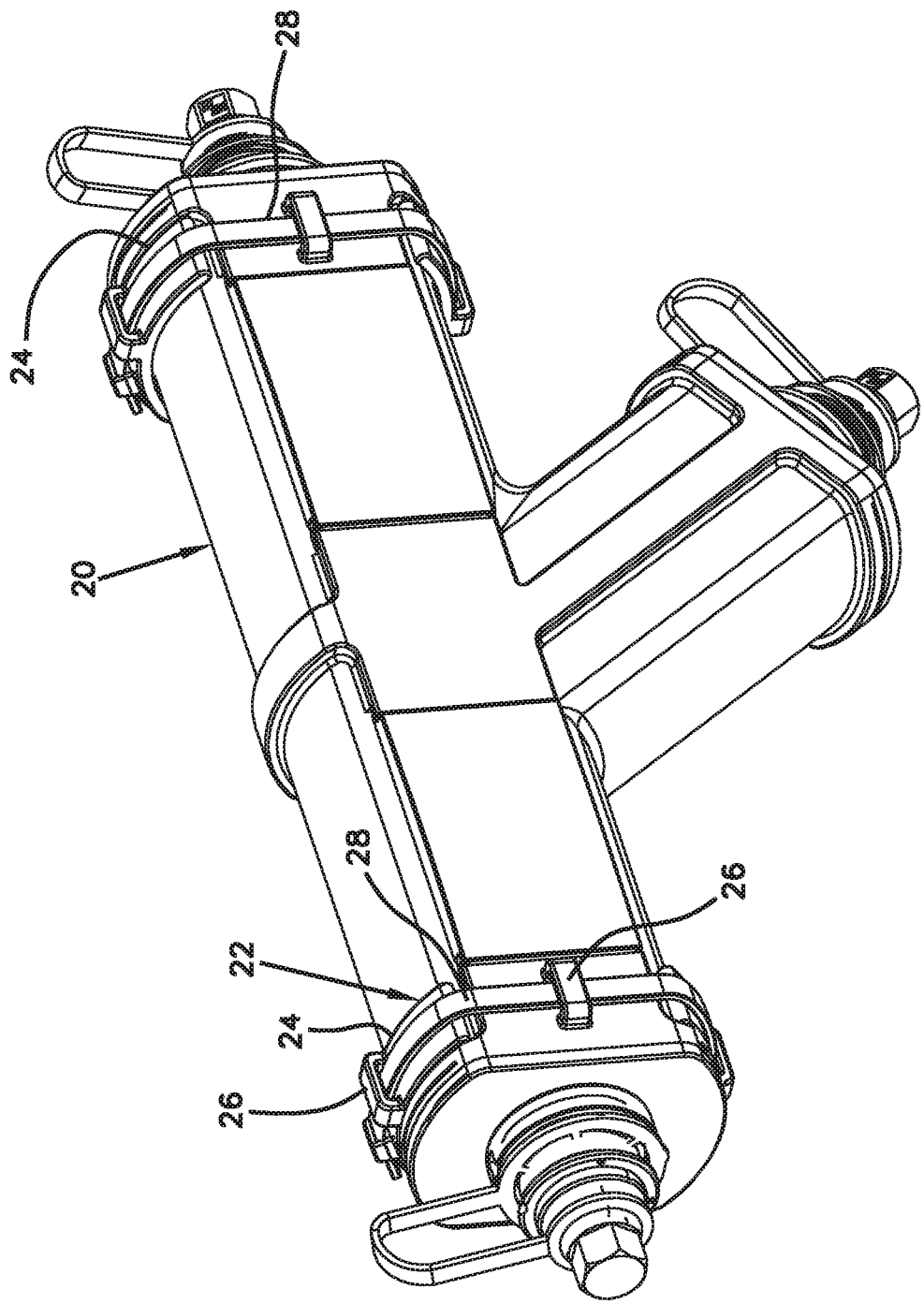
FIG. 1 is a front, perspective view of a telecommunications enclosure in accordance with the principles of the present disclosure, a mounting bracket is shown attached to the telecommunications enclosure.
Figure 2:
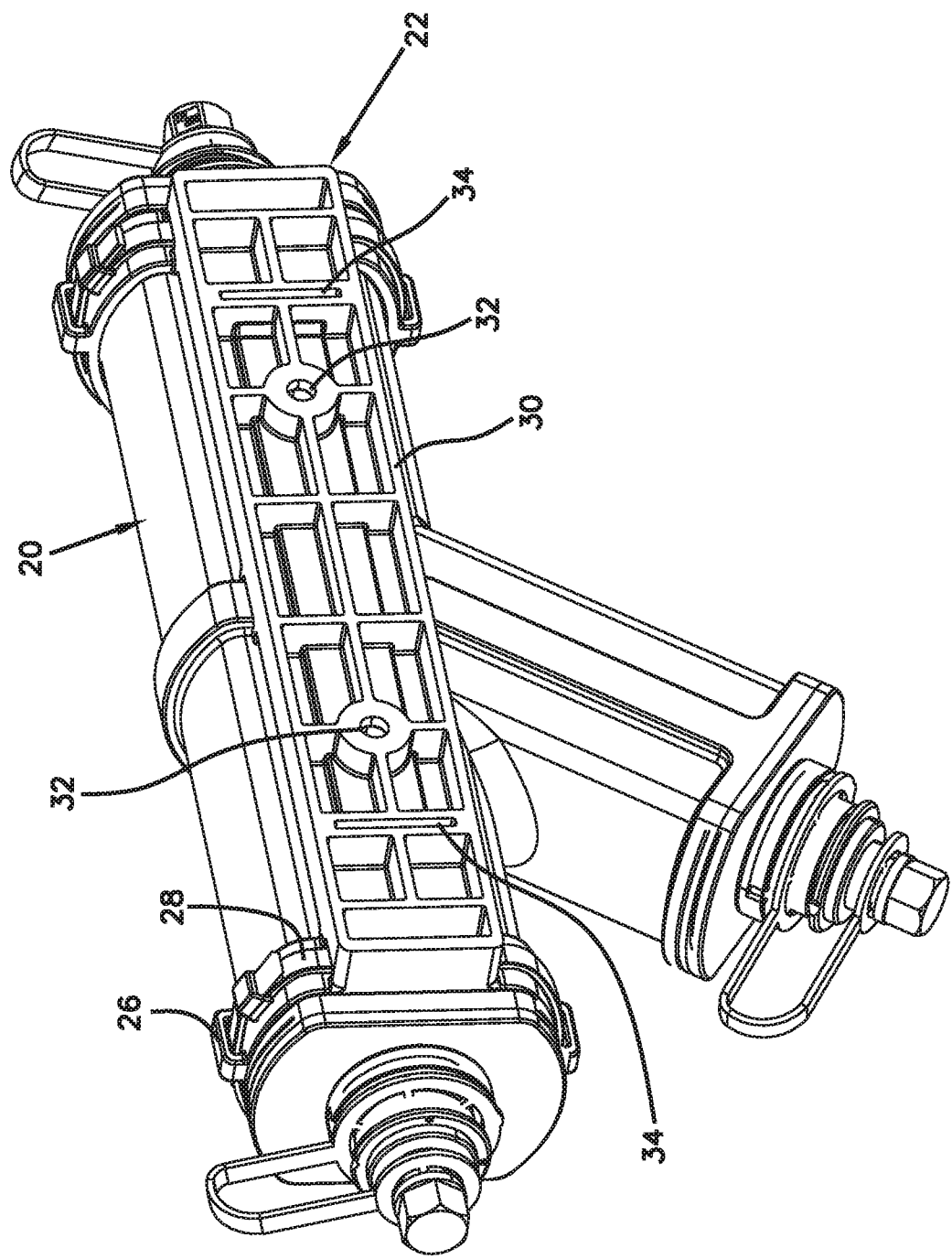
FIG. 2 is a rear perspective view of the telecommunications enclosure and mounting bracket of FIG. 1.
Figure 3:
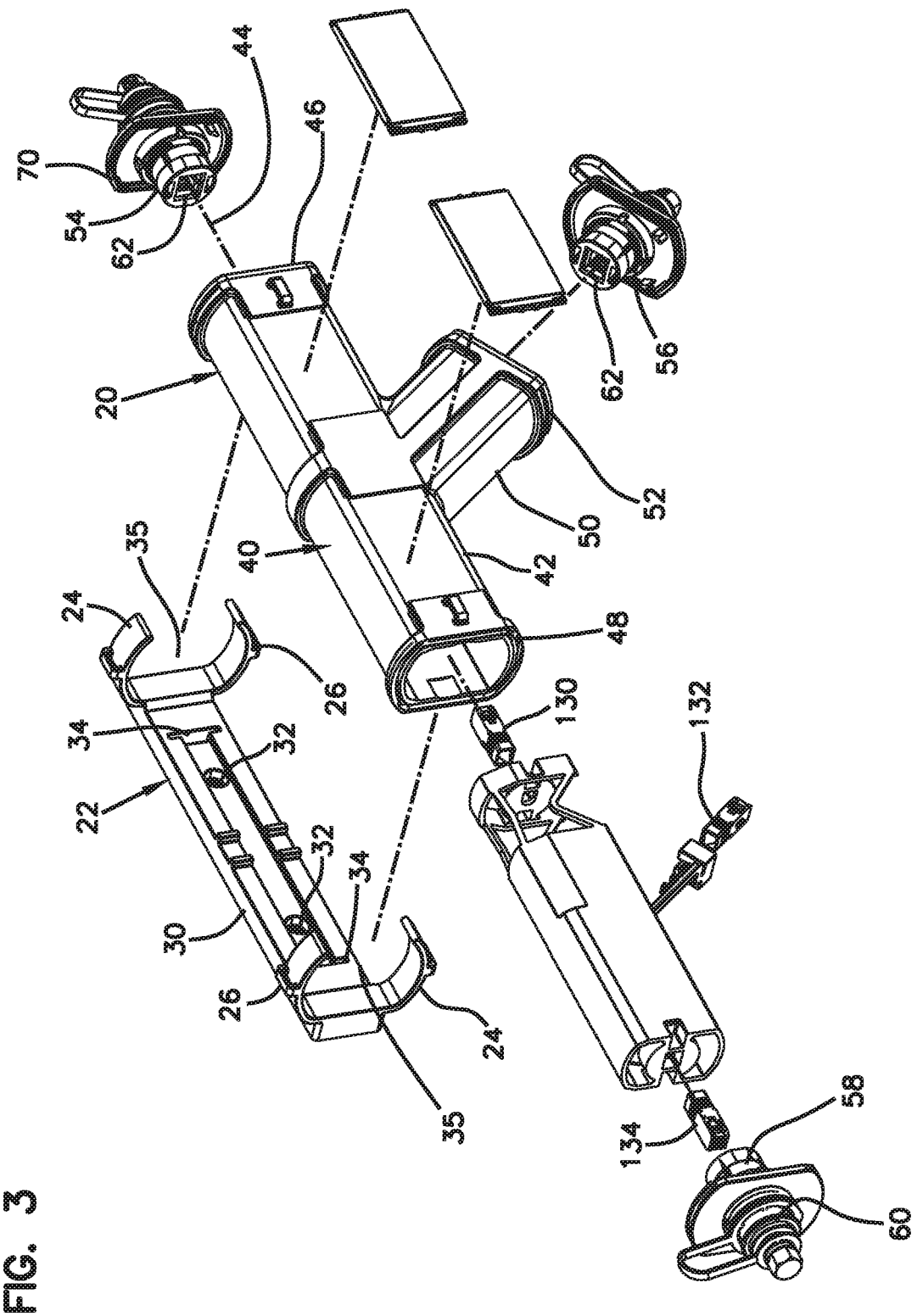
FIG. 3 is an exploded view of the telecommunications enclosure and mounting bracket of FIGS. 1 and 2.
Figure 4:
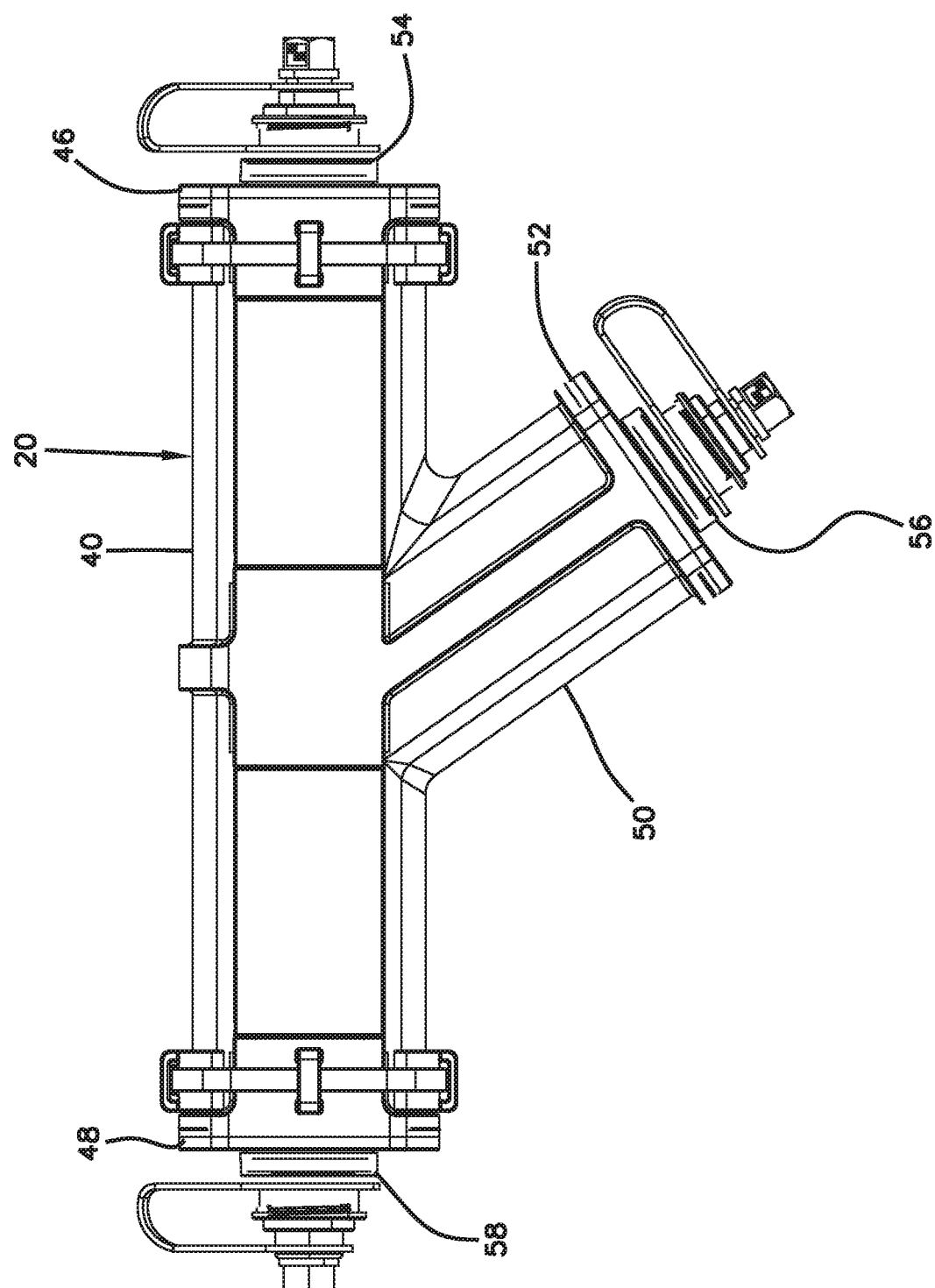
FIG. 4 is a front view of the telecommunications enclosure and mounting bracket of FIGS. 1 and 2.
Figure 5:
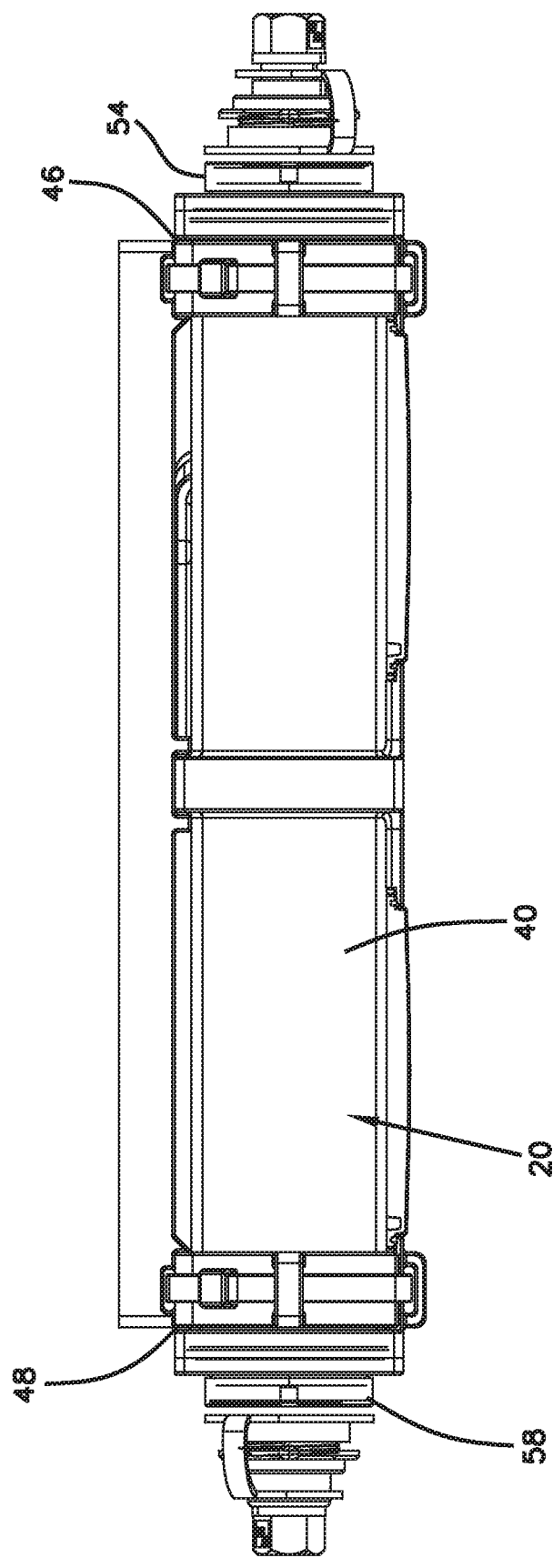
FIG. 5 is a top view of the telecommunications enclosure and mounting bracket of FIGS. 1 and 2.
Figure 6:
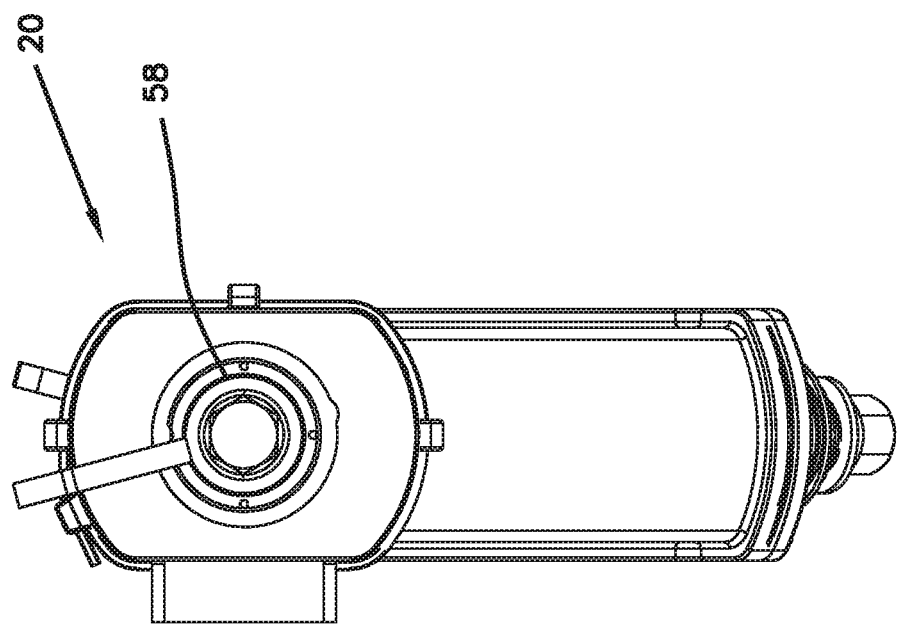
FIG. 6 is an end view of the telecommunications enclosure and mounting bracket of FIGS. 1 and 2.
Figure 7:
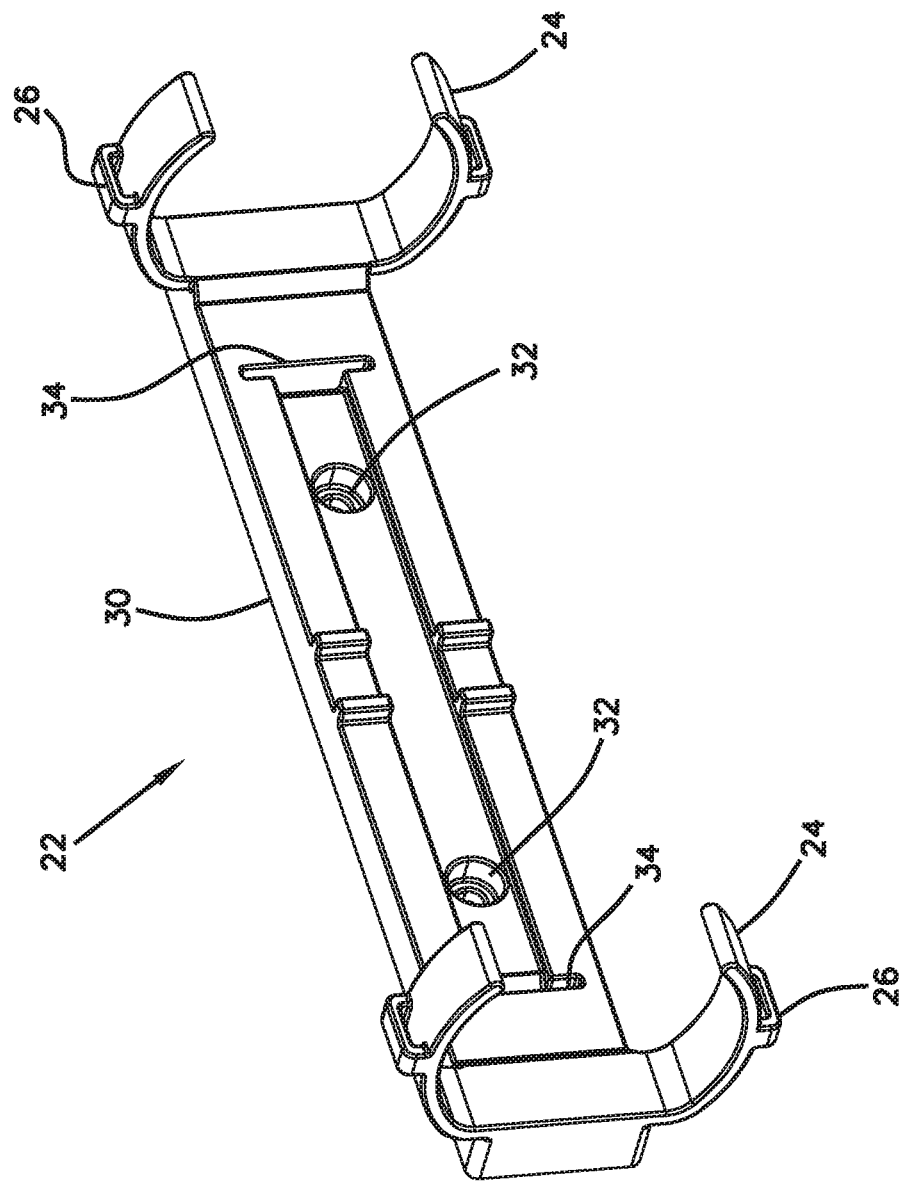
FIG. 7 is a perspective view of the mounting bracket of FIGS. 1 and 2.
Figure 8:
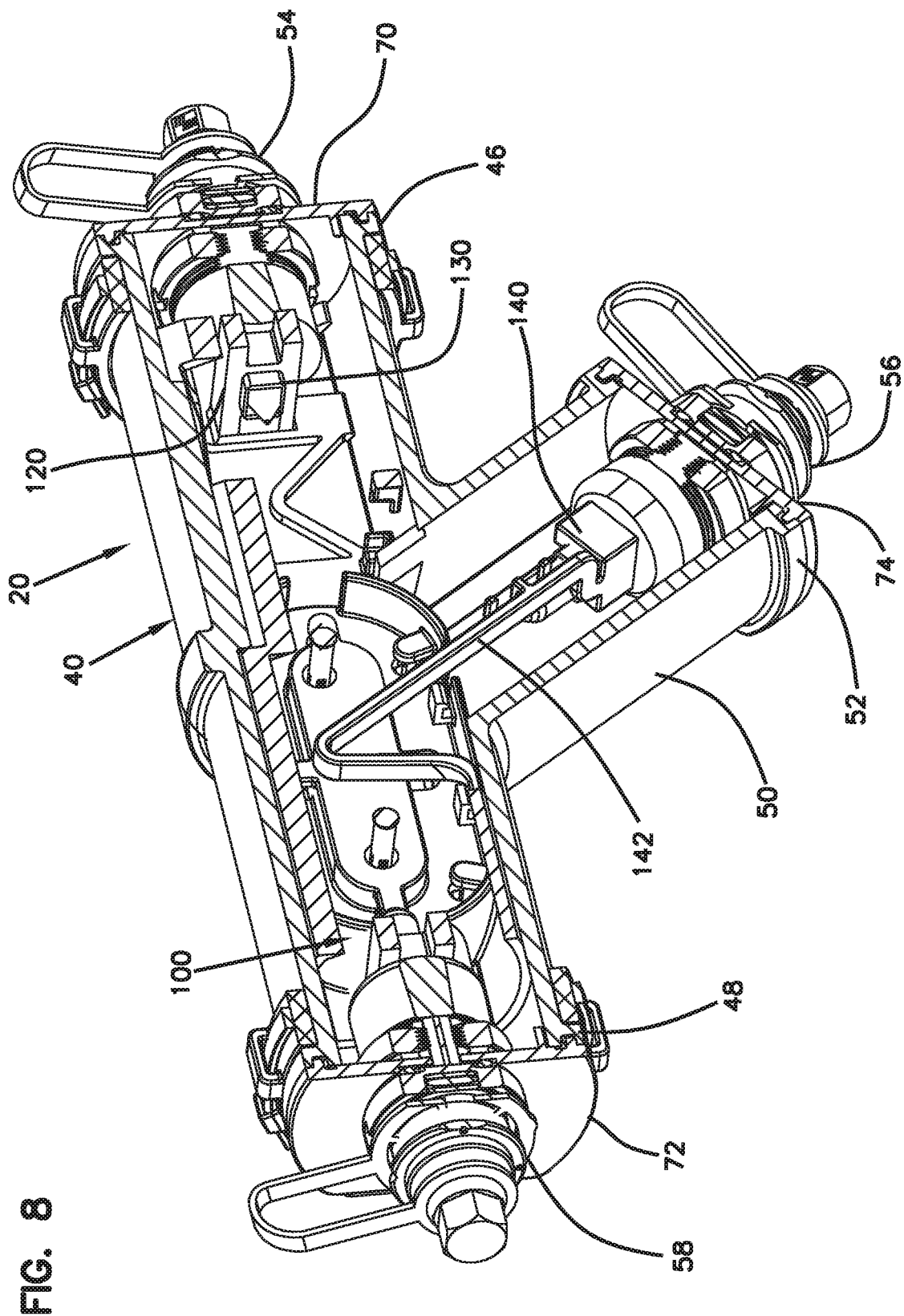
FIG. 8 is a cross sectional view of the telecommunications enclosure and mounting bracket of FIGS. 1 and 2.

FIGS. 1 and 2 depict a telecommunications enclosure 20 in accordance with the principles of the present disclosure. The telecommunications enclosure 20 is shown secured to a mounting bracket 22 for use in securing the telecommunications enclosure 20 to a structure such as a wall, pole, wire or the like. The mounting bracket 22 includes resilient clips 24 for temporarily securing the mounting bracket 22 and the telecommunications enclosure 20 together. The clips 24 define strap receivers 26 for receiving straps 28 that wrap around the telecommunications enclosure 20 around the clips 24 and through slots in a base 30 of the bracket 24 to more securely secure the telecommunications enclosure 20 the mounting bracket 22. The telecommunications enclosure 20 can also include strap receivers 26 at its front side. The base 30 of the bracket 24 can define fastener openings 32 for receiving fasteners used to secure the mounting bracket 22 to a structure such as a wall or a pole. The base can also define slits 34 for receiving a strap used to secure the mounting bracket 22 to a pole or other structure. The clips 24 are generally C-shaped and flex open to receive the telecommunications enclosure 32 within an enclosure receiving region 35 of the clips 24. FIG. 7 shows the mounting bracket 22 in isolation from the telecommunications enclosure 20.

Referring to FIGS. 3-6, the telecommunications enclosure includes a housing 40 having a main body section 42 which defines a main axis 44. The main body section 42 includes a length that extends along the main axis 44 between first and second in-line ends 46, 48 of the housing 40. The housing 40 also includes a branch section 50 that branches outwardly from the main body section 42 at an intermediate location between the first and second in-line ends 46, 48 of the housing 40. The branch section 50 defines an offset end 52 of the housing 40. The telecommunications enclosure also includes a first fiber optic adapter 54 positioned at the first in-line end 46 of the housing 40, a second fiber optic adapter 56 positioned at the offset end 52 of the housing 40, and a third fiber optic adapter 58 positioned at the second in-line end 48 of the housing 40. Each of the fiber optic adapters 54, 56, and 58 includes an outer connector port 60 accessible from outside the housing 40 and an inner connector port 62 facing inside the housing 40. It will be appreciated that the fiber optic adapters 54, 56, and 58 include internal structure for facilitating aligning the optical fibers of two fiber optic connectors desired to be optically coupled together. For example, the fiber optic adapters 54, 56, and 58 can include internal split sleeves for aligning the ferrules of two single-fiber fiber optic connectors desired to be optically coupled together. In other examples, the fiber optic adapters 54, 56, and 58 may be configured for coupling the optical fibers of multi-fiber fiber optic connectors. Example single-fiber fiber optic adapters are disclosed by U.S. Pat. No. 7,744,288 which is hereby incorporated by reference in its entirety. Example multi-fiber fiber optic adapters are disclosed by U.S. Pat. No. 7,264,402, which is hereby incorporated by reference.

Figure 22:
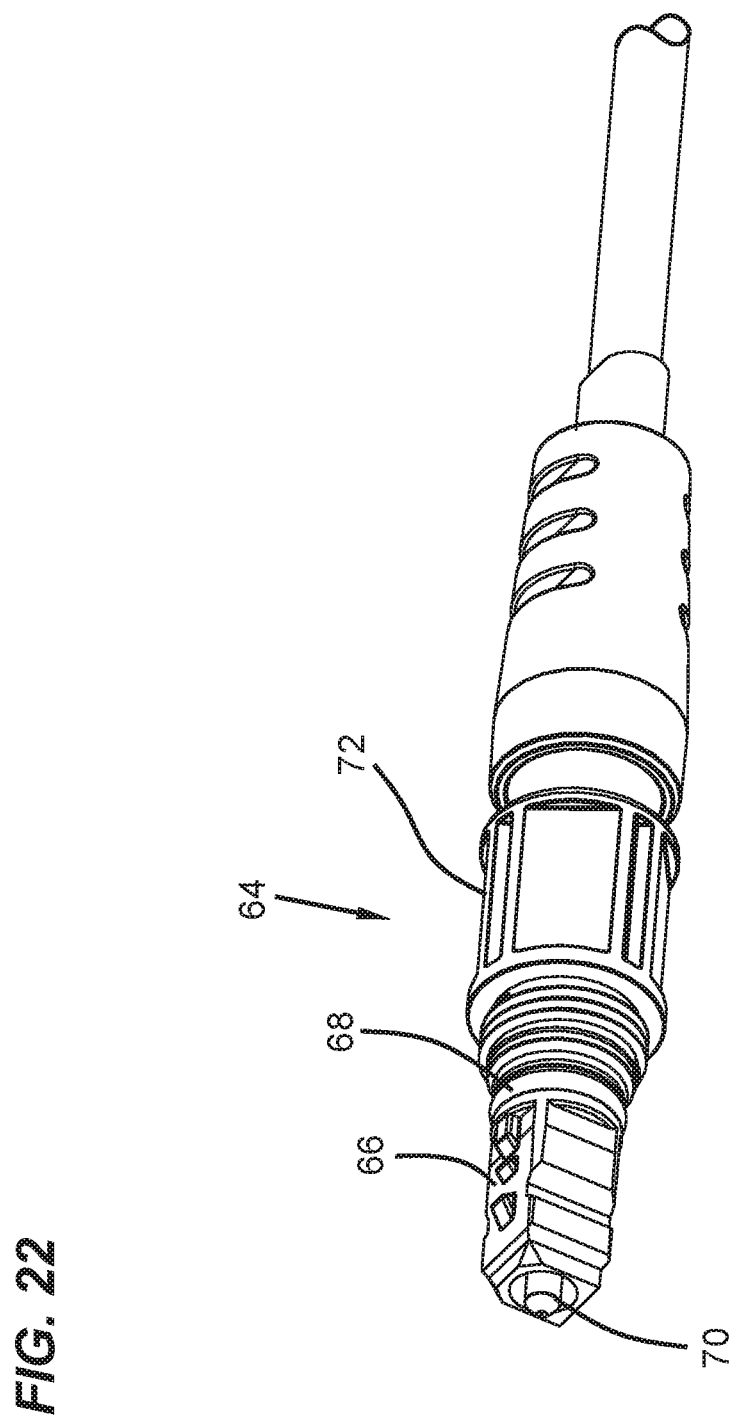
FIG. 22 depicts an example hardened fiber optic connector.

It will be appreciated that the outer connector ports 60 are preferably configured to receive hardened fiber optic connectors. FIG. 22 shows an example hardened fiber optic connector 64 having a connector body 66 supporting an environmental seal 68 and supporting a ferrule 69 at its distal end. The hardened fiber optic connector 64 can be secured within a corresponding port of a hardened fiber optic adapter by a turn-to-secure fastening element which is shown in the depicted example as a nut 73 having exterior threads adapted to mate with corresponding interior threads of the fiber optic adapter. Alternative turn-to-secure fastening elements can include connecting elements having bayonet-type interfaces or other interfaces. It will be appreciated that when a hardened fiber optic connector is installed within a corresponding port of a hardened fiber optic adapter, it is preferred for an environmental seal to be provided between the fiber optic connector and the fiber optic adapter. The seal may be carried by the fiber optic connector, or in alternative examples may be carried by the fiber optic adapter.

As indicated previously, the outer connector ports 60 of the fiber optic adapters 54, 56, and 58 are configured to receive hardened fiber optic connectors. The outer connector ports 60 preferably include turn-to-secure interfaces (e.g., threads, bayonet interfaces, or other interfaces) for engaging with corresponding turn-to-secure fastening elements of the hardened fiber optic connectors. When the hardened fiber optic connectors are installed within the fiber optic adapters 54, 56, and 58, the fiber optic connectors are preferably sealed relative to the fiber optic adapters 54, 56, and 58. The inner connector ports 62 are preferably configured for receiving non-hardened fiber optic connectors. As depicted, the inner connector ports 62 are configured for receiving SC-type fiber optic connectors. In other examples, the inner connector ports 62 may be configured for receiving other types of fiber optic connectors such as LC fiber optic connectors or other types of connectors.

The first in-line end 46 of the housing 40 is enclosed by a first end plate 70 bonded to the main body section 42 at the first in-line end 46 of the housing 40. The first fiber optic adapter 54 is coupled to the first plate. The second in-line end 48 of the housing 40 is enclosed by a second plate 72 bonded to the main body section 42 at the second in-line end 48 of the housing 40. The third fiber optic adapter 58 is coupled to the second plate 72. The offset end 52 of the housing 40 is enclosed by a third plate 74 bonded to the branch section 50 at the offset end 52 of the housing 40. The second fiber optic adapter 56 is coupled to the third plate 74.

In one example, the first, second and third plates 70, 72, and 74 are bonded to their respective housing ends after the internal fiber optics and fiber optic management structures have been loaded into the interior of the housing 40. In certain examples, an insert arrangement can be used to facilitate routing optical fibers within the interior of the housing 40 and to provide pre-positioning of internal fiber optic connectors corresponding to the fiber optic adapters 54, 56, and 58. In certain examples, the insert arrangement can be configured to allow the optical fibers and the fiber optic connectors to be pre-positioned on the insert arrangement in the desired routing and positioning configuration prior to loading the insert arrangement into the interior of the housing 40. In certain examples, the insertion process can include a linear insertion process through the in-line portion of the housing 40.

In certain examples, the main body section 42 and the branch section 50 are molded as a one-piece unit having a monolithic construction. The monolithic construction can include a composition that includes plastic. In certain examples, branch section 50 is aligned at an oblique angle relative to the main body section 42. In one example, the branch section 50 angles away from the second in-line end 48 of the housing 40. The angling away of the branch section 50 facilitates routing optical fiber from the in-line main-body section 42 to the branch section 50 from the direction of the second in-line end 48. In other examples, the branch section 50 may be perpendicular relative to the in-line section. In the depicted example, the main body section 42 is cylindrical in shape.

It will be appreciated that the plates 70, 72, and 74 can be bonded to their respective ends of the housing 40 by any number of different bonding techniques. For example, the end plates 70, 72, and 74 can be welded (e.g., friction welded, high-frequency welded, hot gas welded, hot plate welded, solvent welded, laser welded, induction welded, ultrasonically welded, etc.) to their respective ends of the housing 40. In certain examples, an intermediate bonding material may be used to bond the plates 70, 72, and 74 to their respective housing ends and to provide sealing between the plates 70, 72, and 74 and their respective housing ends. Example bonding materials can include adhesive materials such as epoxies. The bonding materials can include thermoset materials and thermoplastic materials. In one example, the plates 70, 72, and 74 may be secured to their respective housing ends using a strength seal. In certain examples, the strength seal can be disposed within a groove adjacent to a tongue. In certain examples, the plates 70, 72, and 74 can include the tongues and the housing ends can include grooves for receiving the tongues. In other examples, the configuration can be reversed with the tongues being provided at the ends of the housing and the grooves being provided within the plates 70, 72, and 74. In certain examples, the strength seal can include a thermoplastic bonding material having magnetically active particles to activate the strength seal. To activate the strength seals, an electromagnetic field is introduced to the strength seals. The electromagnetic field induces eddy currents in the magnetically active particles, which heats the particles. Heating the particles softens and activates the thermoplastic material and allows the material to bond with the housing ends and the end plates 70, 72, and 74. Preferably, the components designed to be bonded together are compressed together while the strength seal is activated. Upon cooling, the thermoplastic material hardens, thereby securing the plates 70, 72, and 74 to the ends of the housing 40. One example embodiment employs EMABOND™ commercially available from Ashland Specialty Chemical Company of Ohio as the thermoplastic material with embedded magnetically active particles. Additional information relating to strength seals can be found in U.S. Pat. No. 7,753,596, which is hereby incorporated by reference in its entirety.

It will be appreciated that the configuration of the telecommunications enclosure 20 is relatively simple and includes a relatively low number of parts. Further, the telecommunications enclosure 20 is configured to support an architecture which allows components such as multi-service terminals containing optical power splitters or wavelength division multiplexers to be added to the architecture over time to meet customer demand. In this manner, the cost associated with the multi-service terminals and their corresponding optical splitters can be deferred until customer demand requires the expanded architecture. By stringing together a plurality of the telecommunications enclosures 20 in a daisy-chain type fashion via fiber optic cables coupled to the in-line ends 46, 48 of the enclosures 20, the outer connector ports 60 of the fiber optic adapter 56 at the offset ends 52 are distributed across a given network region and are readily available for adding additional telecommunications equipment to the architecture.

Figure 20:
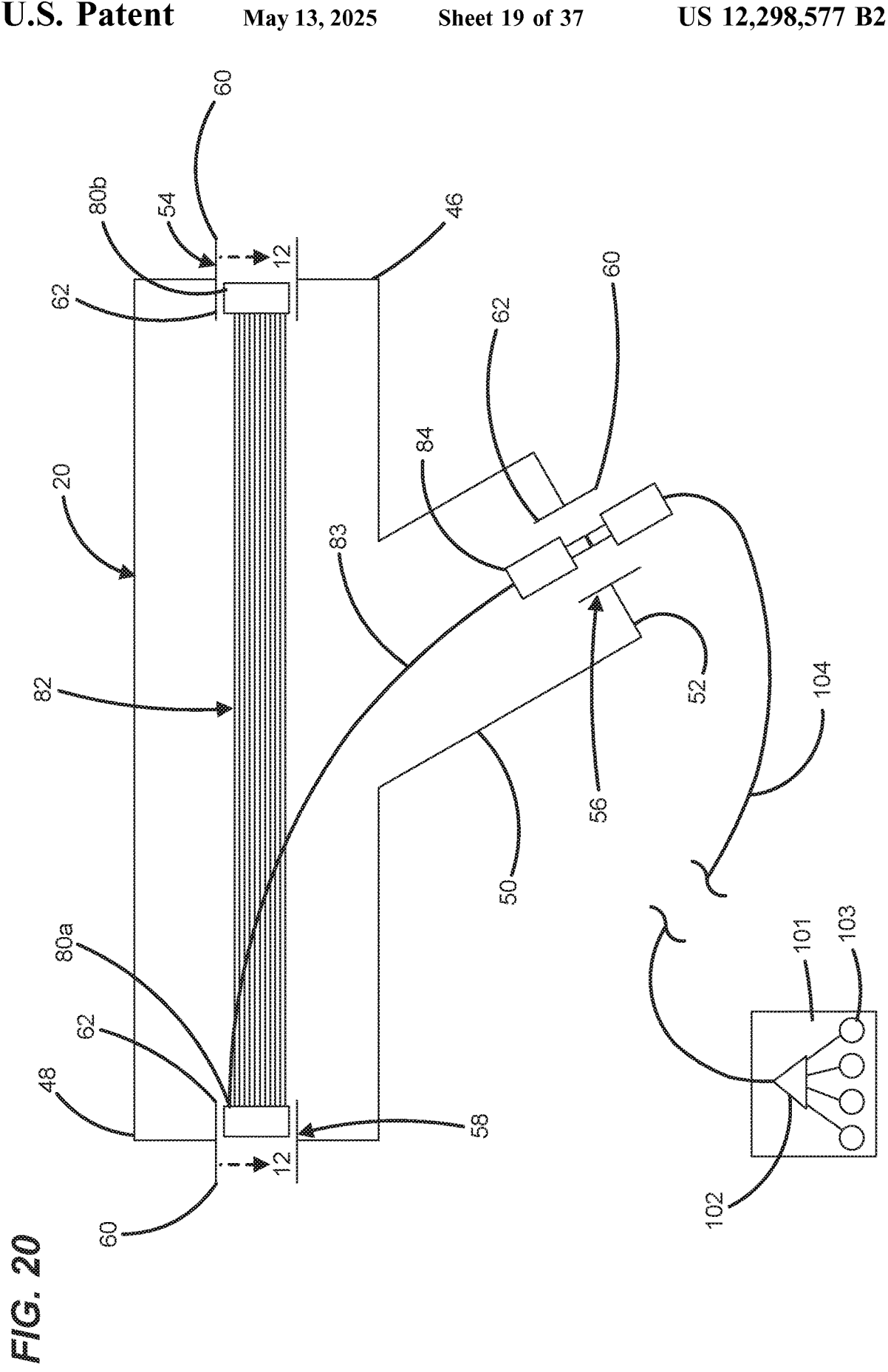
FIG. 20 depicts an example indexing configuration that can be used with telecommunications enclosures in accordance with the principles of the present disclosure.

It will be appreciated that various fiber optic architectures can be provided within the interior of the housing 40. FIG. 20 shows an example indexing architecture incorporated with the telecommunications enclosure 20. As shown at FIG. 20, multi-fiber optical connectors 80a, 80b are installed at the inner ports 62 of the first and third fiber optic adapters 54, 58. In alternative examples, the multi-fiber connector 80a may be positioned at the end of a tether coupled to the end of the housing 40 rather than being installed directly at the end of the housing (e.g., see the tether cable version of the telecommunications enclosure depicted at FIGS. 17 and 18). A plurality of optical fibers 82 are indexed between the multi-fiber connectors 80a, 80b. For example, as depicted, the multi-fiber connectors 80a, 80b each have twelve fiber positions labeled 1-12. An optical fiber 83 corresponding to the first position of the multi-fiber connector 80a is shown being dropped to a fiber optic connector 84 positioned within the inner connector port 62 of the second fiber optic adapter 56 at the offset end 52 of the housing 40. The remaining optical fibers 82 corresponding to positions 2-12 of the multi-fiber connector 80a are routed to multi-fiber connector 80b and are indexed so as to be positioned respectively at positions 1-11 of the multi-fiber connector 80b. Further details about indexing architectures are disclosed by International Publication No. WO2014/190281, which is hereby incorporated by reference in its entirety.

Figure 21:
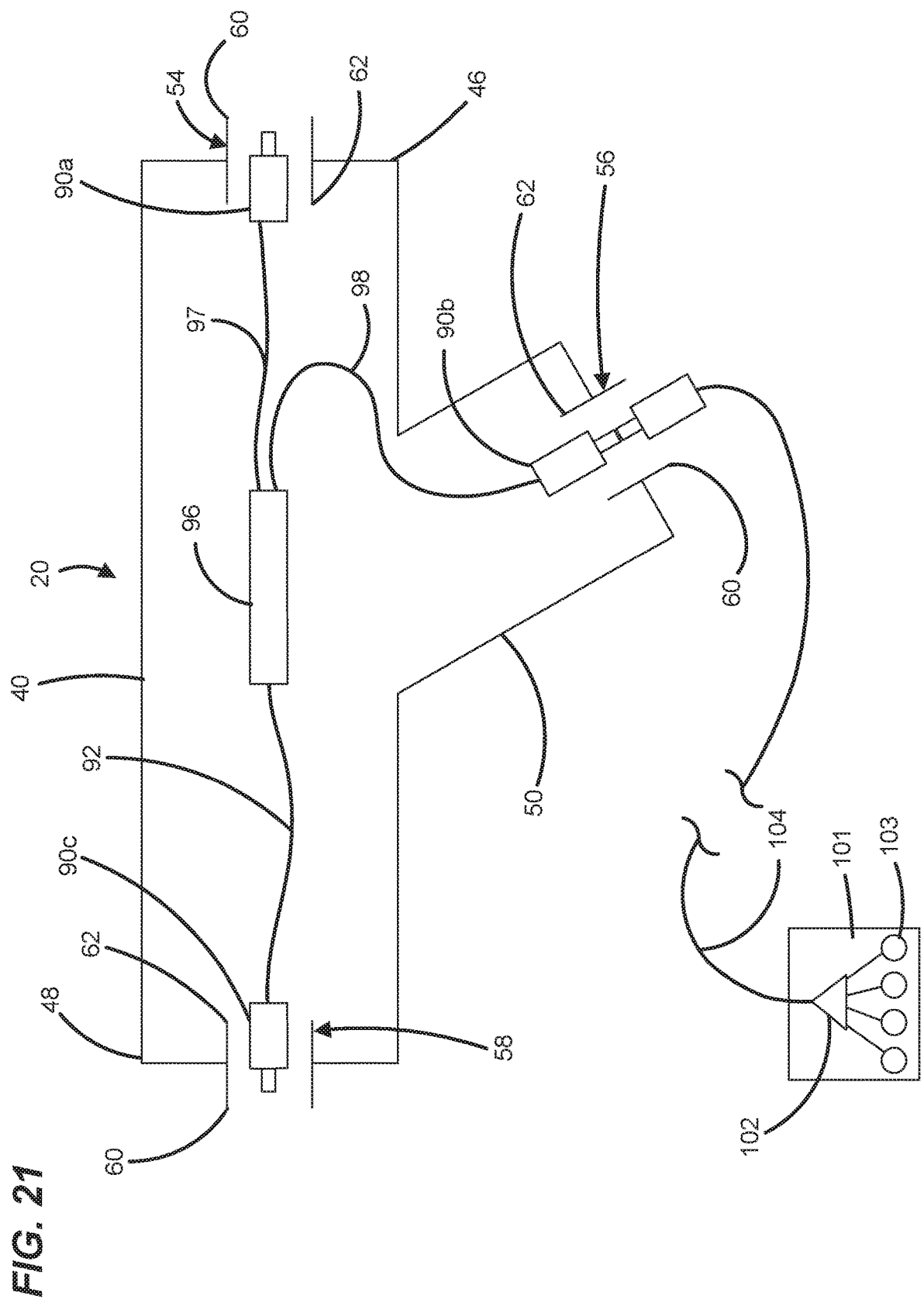
FIG. 21 is a schematic view showing a splitting architecture that can be used with telecommunications enclosures in accordance with the principles of the present disclosure.

FIG. 21 shows another example fiber routing architecture that can be utilized within the interior of the enclosure 20. In the depicted example, single-fiber fiber optic connectors 90a-c are respectively positioned in the inner connector ports 62 of the fiber optic adapters 54, 56, and 58. An optical fiber 92 is routed from the fiber optic connector 90c to an optical device 96. It will be appreciated that the optical device 96 can include a device such as a symmetrical passive optical power splitter, an asymmetric optical power splitter (e.g., an optical power tapping device) or a wavelength division multiplexer. The optical fiber 92 connects to an input side of the device 96 and the device optically couples the fiber 92 to output fibers 97, 98 respectively routed to the connectors 90a and 90b. In the case where the device 96 is an optical power tapping device, the tapping device 96 routes a majority of the power of an optical signal from the optical fiber 92 through the device 96 to the optical fiber 97 which routes to the fiber optic connector 90a. Therefore, a majority of the power of the optical signal input to the enclosure via the connector 90c passes directly through the enclosure 20 in an in-line manner and is output through the connector 90a. The tapping device taps a smaller portion of the power of the signal and directs that portion of the power of the signal through fiber 98 which is directed through the branch section 50 to the fiber optic connector 90b located at the offset end 52. In a case where the device 96 is a wavelength division multiplexer, the device 96 extracts pre-determined wavelengths from the signal stream being routed inline through the device and directs such extracted wavelengths through the branch section 50 to the second fiber optic connector 90b. The non-extracted wavelengths are passed from connector 90c, through the device 96, to the connector 90a. In the case where the device 96 is a symmetric passive optical power splitter, the device 96 evenly splits the signal provided from fiber 92 to each of the output fibers 97, 98. Thus, the optical signal received at the fiber optic connector 90c is power split evenly at the device 96 and half of the signal power is directed inline to the fiber optic connector 90a while the other half is directed through the branch section 50 to the second fiber optic connector 90b. Example tapping architectures and strategies for installing telecommunications equipment over time are disclosed by International Publication No. WO2018/231833, which is hereby incorporated in its entirety.

The systems depicted at FIGS. 20 and 21 allow for a network to be inexpensively installed at a first date, and then expanded at a later date. In this way, cost can be deferred. The network can be installed by connecting a plurality of the enclosures together with fiber optic cables routed between the fiber optic adapters 54, 58 at the in-line ends of the enclosure 20. The network can be expanded by optically connecting telecommunication equipment to the pre-installing in-line optical fiber via the branch ports defined by the fiber optic adapters 56. For example, drop terminals 101 having passive optical power splitters 102 and hardened drop ports 103 defined by hardened fiber optic adapters can be coupled to the adapters 56 via fiber optic cable 104.

Referring to FIGS. 8-17, the telecommunications enclosure 20 also includes an optical fiber and connector management insert 100 having a form factor suitable for allowing the optical fiber and connector management insert 100 to be loaded into the main body section 42 of the housing 40 through the second in-line end 48 of the housing 40. Preferably, the optical fibers can be pre-routed in a desired routing path on the insert 100 before loading the insert into the housing 40. The pre-routing path preferably corresponds to the final intended routing path of the optical fibers when the insert 100 is loaded into the housing 40. In certain examples, fiber optic connectors can also be pre-positioned prior to loading the insert into the housing 40. The pre-positioned locations of the fiber optic connectors can correspond to desired final position locations of the connectors when the telecommunications enclosure 20 is fully assembled. In certain examples, the end plates 70, 72, and 74 are mounted at the ends of the housing 40 after the insert 40 has been pre-routed with optical fibers and connectors and the insert has been loaded into the housing 40.

Figure 11:
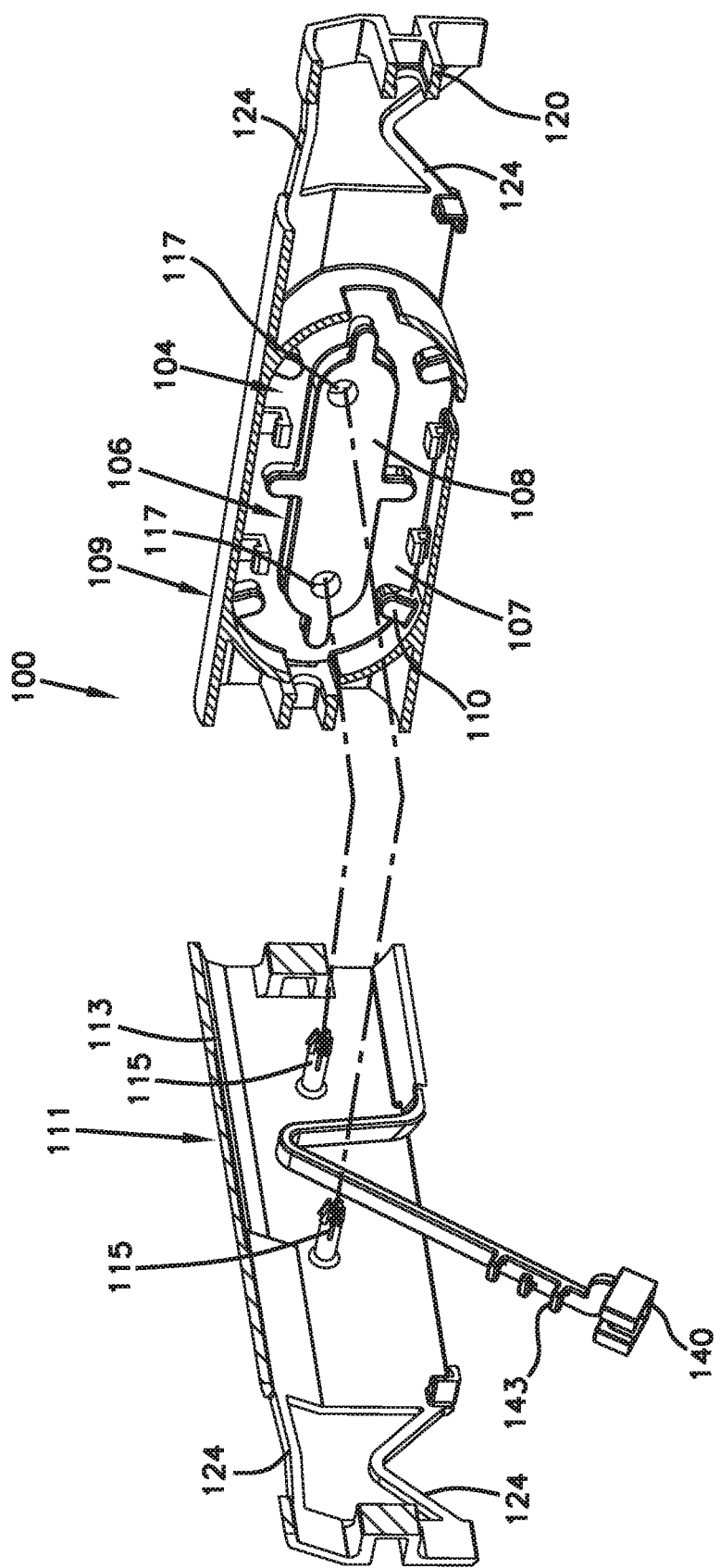
FIG. 11 is an exploded view of the optical fiber and connector management insert of FIGS. 9 and 10.

The insert 100 includes a tray portion 102 including a fiber loop-storage region 104. The fiber loop-storage region 104 can include one or more fiber routing paths for allowing the storage of optical fiber within the insert. The loop-storage paths can include storage paths routed in a racetrack configuration, a FIG. 8 configuration, circular configuration, an oval configuration, or other configurations suitable for maintaining desired bend radius limitations of the optical fibers. As depicted at FIG. 11, the loop-storage region 104 defines a loop-storage path 106 in the shape of a racetrack surrounding a central island 108. The racetrack shape is formed by a channel 107. Fibers are held within the channel by fiber retention fingers 110 that project at least partially over the channel 107. The insert 100 can be formed of a plastic material and can be manufactured in one or more parts. As depicted at FIG. 11, the tray portion 102 includes a first piece 109 defining the fiber loop-storage region 104, and a second piece 111 including a cover 113 that mates with the first piece to enclose the fiber loop-storage region 104. The pieces 109, 111 can be coupled together by a snap fit connection such as by posts 115 that snap into openings 117.

Figure 9:
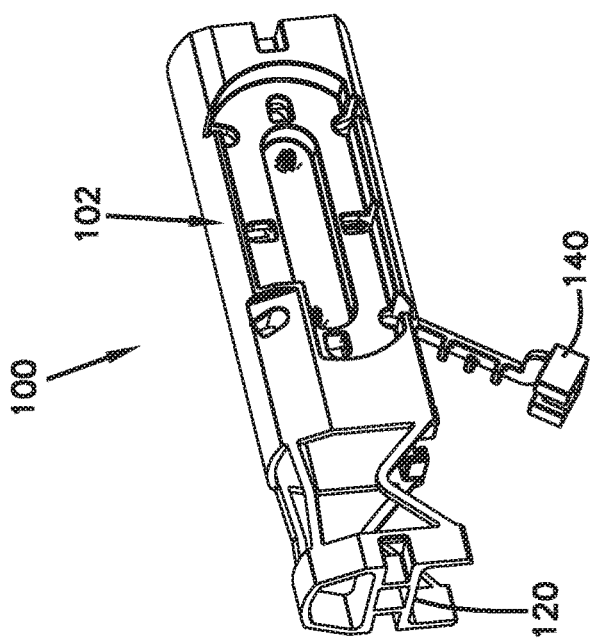
FIG. 9 is a perspective view of an optical fiber and connector management insert of the telecommunications enclosure of FIGS. 1 and 2.
Figure 10:
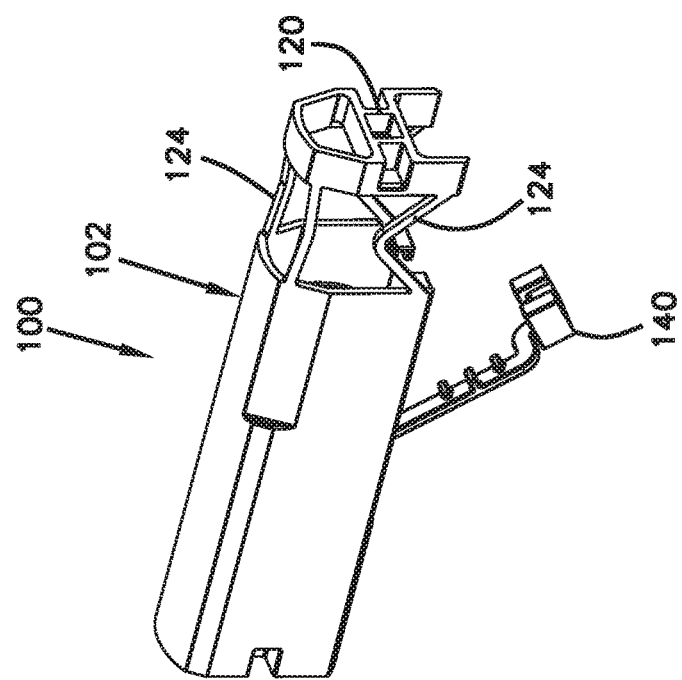
FIG. 10 is another perspective view of the optical fiber and connector management insert of FIG. 9.

Referring to FIGS. 9-11, the insert 100 includes a first connector mount 120 that is movable between an extended orientation and a retracted orientation relative to a main section of the insert defined by the tray portion 102. In certain examples, the first connector mount 120 is resiliently biased toward the extended orientation. In certain examples, the first connector mount 120 is coupled to the tray portion 104 by at least one arm 124 that resiliently flexes as the first connector mount 120 is moved from the extended orientation toward the retracted orientation. As depicted, for arms 124 are provided. The first connector mount 120 is adapted to receive a fiber optic connector 130 (see FIG. 8) and to hold the fiber optic connector 130 and to position the fiber optic connector 130 in alignment with the inner connector port 62 of the first fiber optic adapter 54 when the insert 100 is loaded into the main body section 42 of the housing 40. Once the insert 100 has been loaded into the main body section 42 of the housing 40, the connector mount 120 holds the connector 130 at a position where the connector projects beyond the first in-line end 46. Therefore, the fiber optic connector 130 can be easily plugged into the inner connector port 62 of the first fiber optic adapter 54. After the fiber optic connector 130 has been inserted into the first fiber optic adapter 54, the first plate 70 can be secured to the first in-line end 46 of the main body section 42. As the first plate 70 is pressed toward the first end 46 after the connector 130 has been installed in the inner connector port 62 of the fiber optic adapter 54, the arms 124 flex thereby allowing the first connector mount 120 and the corresponding connector 130 to move from the extended position toward the retracted position to allow for connection of the end plate 70 to the first in-line end 46.

It will be appreciated that the first connector mount 120 moves generally in a linear motion along the main axis 44 of the main body section 42 as the first connector mount 120 moves between the extended and retracted orientations.

The insert 100 also includes a second connector mount 140 that is also movable between an extended orientation and a retracted (e.g., stowed, see phantom line at FIG. 12) orientation relative to the tray portion 102. The second connector mount 140 is resiliently biased toward the extended orientation. In certain examples, the second connector mount 140 is coupled to the tray portion 102 by at least one arm 142 that flexes as the second connector mount is moved from the extended orientation toward the retracted orientation. The arm 142 can include fiber retainers 143 for maintaining a fiber in fibers at a routing path that extends along the length of the arm 142. In certain examples, the second connector mount 140 moves between the extended and retracted orientations along a path that is obliquely angled relative to the main axis 44.

Figure 12:
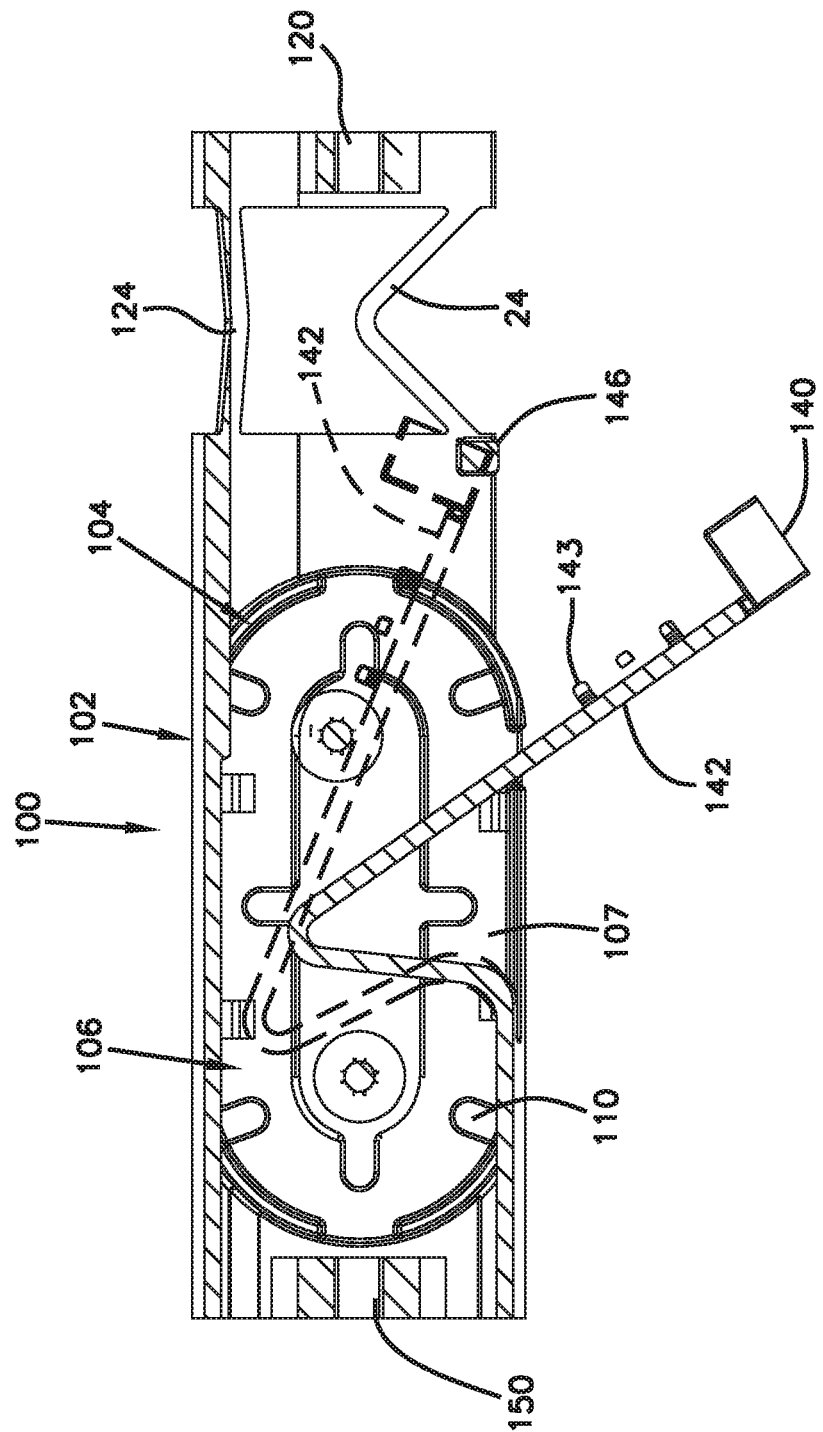
FIG. 12 is a side view of the optical fiber and connector management insert of FIGS. 9-11.
Figure 13:
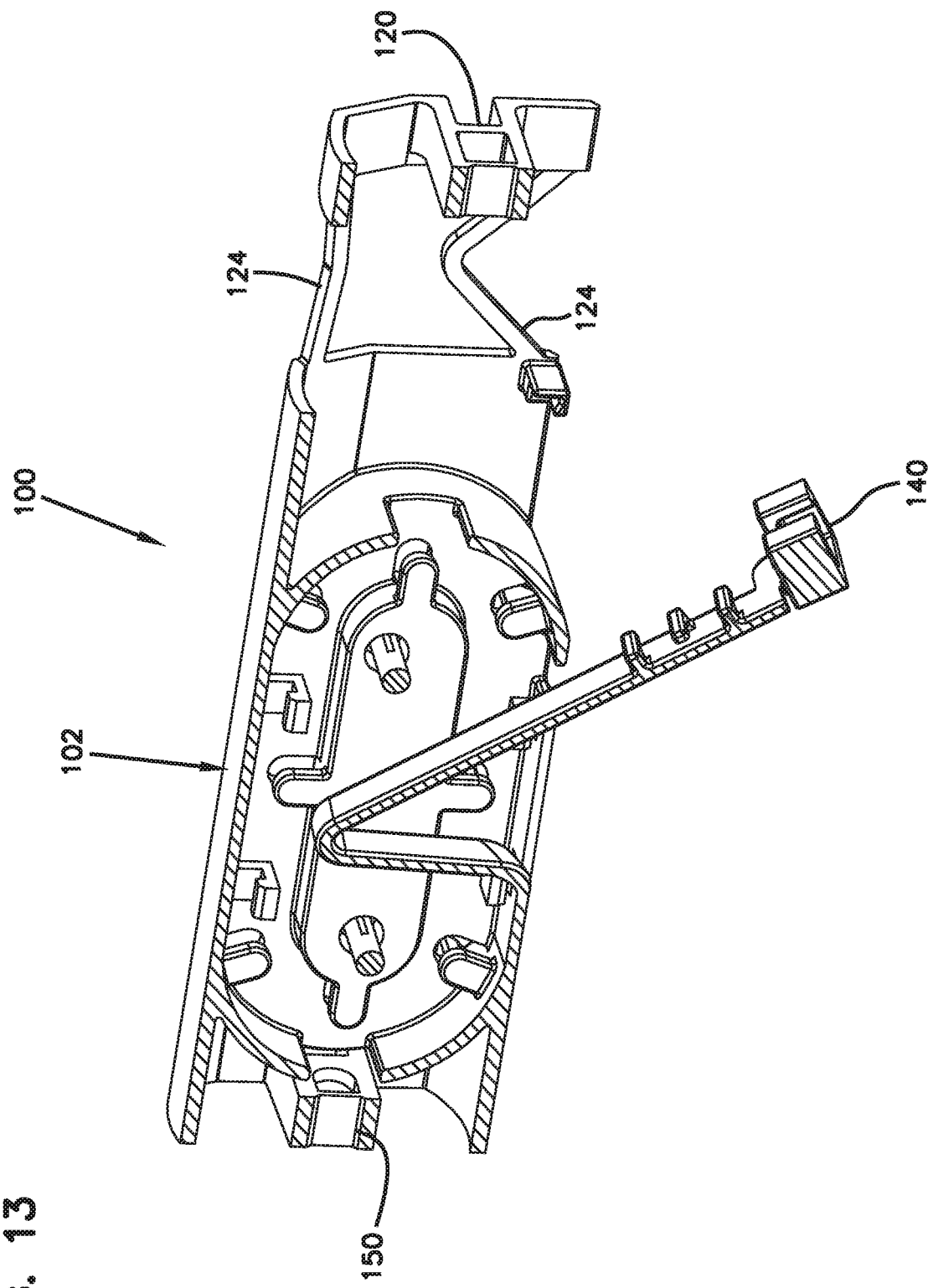
FIG. 13 is a perspective view of the optical fiber and connector management insert of FIG. 12.
Figure 14:
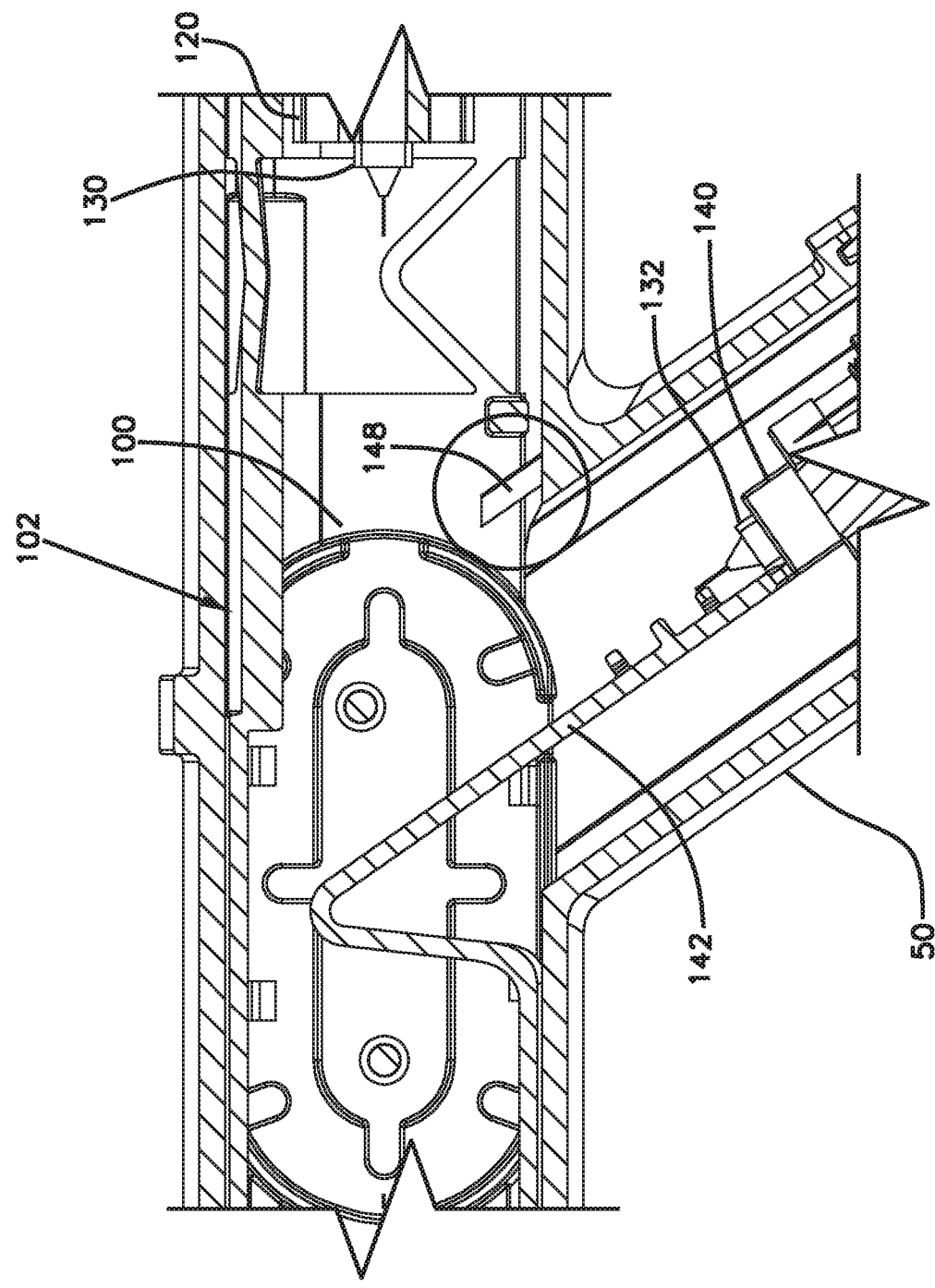
FIG. 14 is a side view showing the optical fiber and management insert of FIGS. 12 and 13 installed within the housing of the telecommunications enclosure of FIGS. 1 and 2.
Figure 15:
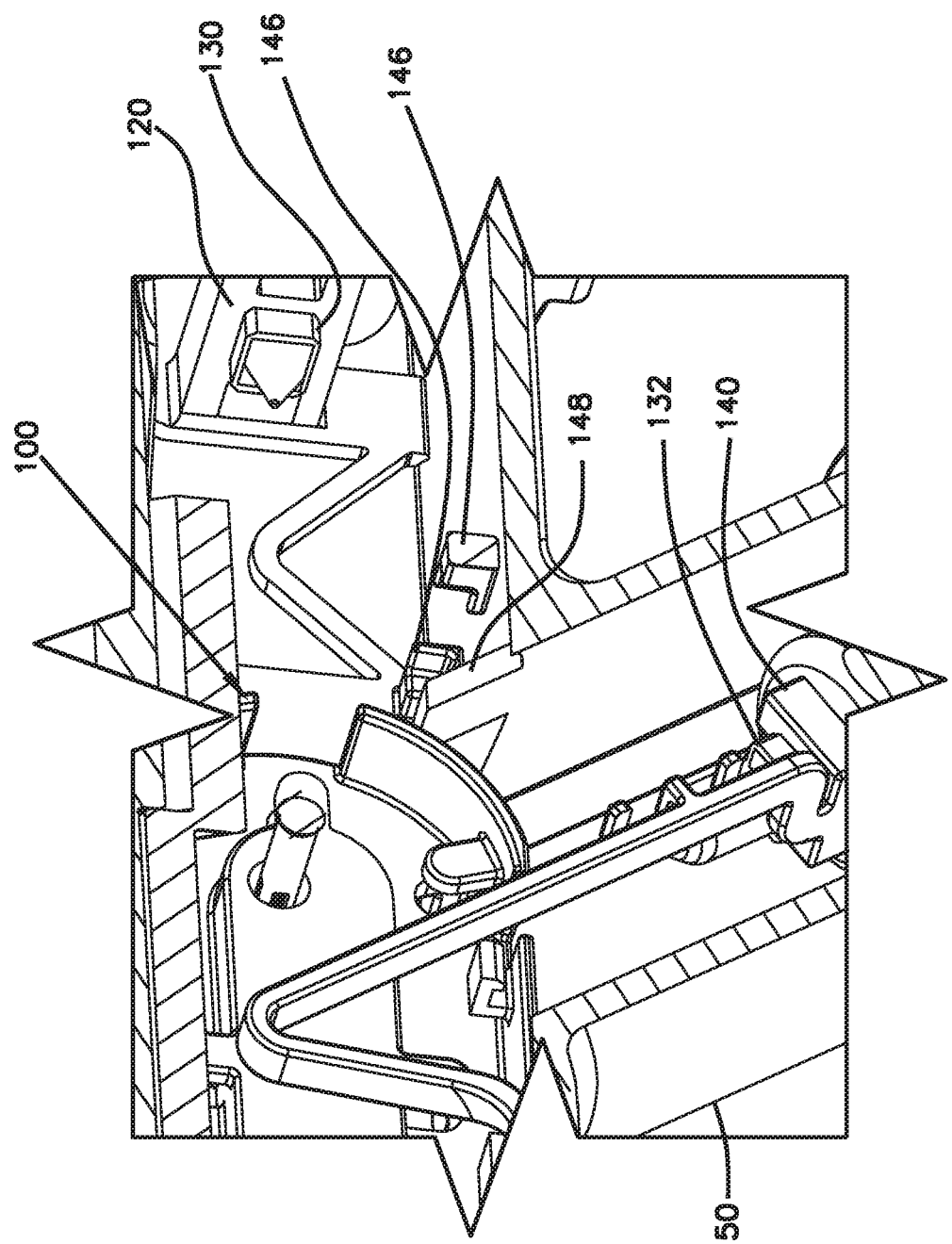
FIG. 15 is a perspective view showing the optical fiber and connector management insert of FIGS. 12 and 13 installed in the housing of the telecommunications enclosure of FIGS. 1 and 2.

In certain examples, when the second connector mount 140 is in the retracted orientation as shown at FIG. 12, the second connector mount 140 and the arm 142 are positioned within the form factor of the insert 100 which is sized to fit within the main body section 42. In contrast, when the second connector mount 140 and the arm 142 are in the extended orientation, the arm 142 extends laterally outwardly from the tray portion 102 and is positioned laterally outside the form factor designed to fit within the main body section 42.

During insertion of the insert 100 into the main body section 42, the second connector mount 140 is held at the retracted orientation by a retainer 146 provided adjacent the tray portion 102. During the linear insertion process of the insert 100 into the main body section 42, the second connector mount 140 engages a release 148 (see FIG. 14) within the housing 40 causing the second connector mount 140 to disengage from the retainer 146 and automatically extend via the resiliency of the arm 142 into the branch section 50 as the second connector mount 140 moves from the retracted orientation toward the extended orientation. In certain examples, when extended the arm 142 is oriented at an oblique angle relative to the main axis 44 of the housing 40, with the oblique angle of the arm 142 generally matching the oblique angle of an axis of the branch section 50.

It will be appreciated that the oblique angle of the branch 50 is selected such that the branch section 50 angles away from the second in-line end 48 of the housing 40 through which the insert 100 is inserted. In this way, the oblique angling of the branch section 50 can facilitate directing the connector mount 140 into the branch section 50 as the second connector mount 140 moves from the retracted position to the extended position.

Once the second connector mount 140 has been moved to the extended orientation within the branch section 50, a fiber optic connector 132 pre-installed in the connector mount 140 is preferably positioned outside the offset end 52 of the branch section 50. This allows the fiber optic connector 130 to be readily inserted into the inner connector port 62 of the second fiber optic adapter 56. Once the fiber optic connector 132 has been inserted in the inner port 62 of the second fiber optic adapter, the third plate 74 can be bonded to the offset end 52. As the second plate 72 is moved toward the offset end 52, the arm 152 can flex to allow the fiber optic connector 132 and the second connector mount 140 to retract within the branch section 150 as the third plate 74 is moved toward the offset end 52 of the branch section 50.

Figure 16:
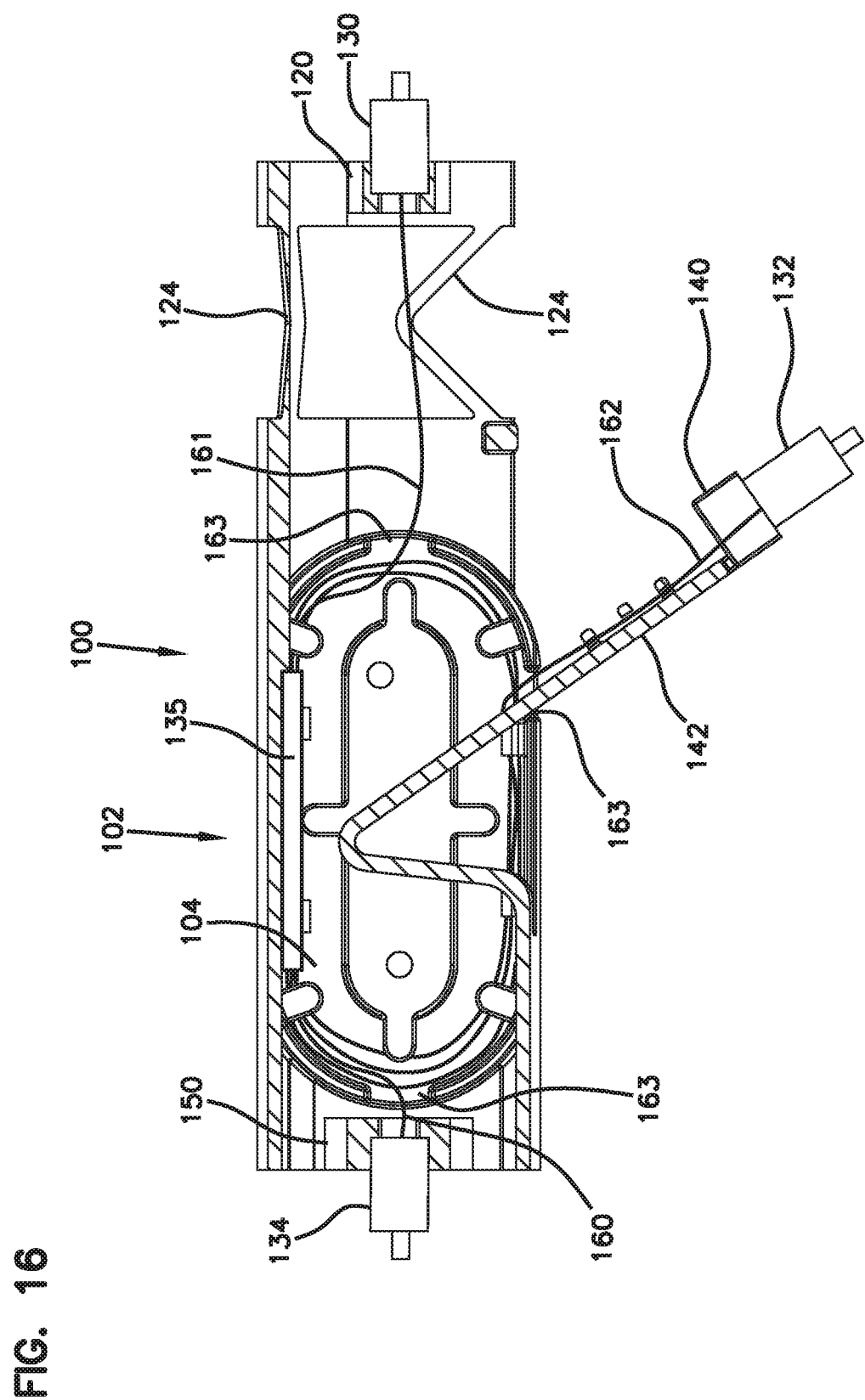
FIG. 16 is a side view showing a fiber routing configuration for the optical fiber and connector management insert of FIGS. 9-13.

The insert 100 also includes a third connector mount 150 for mounting and prepositioning a fiber optic connector 134 at a desired location. The third connector mount 150 is preferably adapted to align the fiber optic connector 134 with the inner connector port 62 of the third fiber optic adapter 58 secured to the second plate 22. In practice, the insert is initially pre-routed with optical fiber and the connectors 130, 132, 134 are mounted at their respective connector mounts 120, 140 and 150. Optical fibers interconnecting the fiber optic connectors 130, 132, and 134 can be pre-routed on the insert 100 as shown at FIG. 16. For example, an optical fiber 160 can be routed from the fiber optic connector 134 to a splitter 135 such as a fiber tap. Excess length of the optical fiber can be stored at the loop-storage region 104. The optical fiber 160 can be optically coupled to an input side of the splitter device 135. Output optical fibers 161, 162 are connected to output sides of the splitter device 135 with the splitter device 135 providing an optical connection between the optical fiber 160 and the output optical fibers 161, 162. The optical fiber 161 is routed from the output side of the splitter device 135 to the fiber optic connector 130 while the optical fiber 162 is routed from the output side of the splitter device 135 to the fiber optic connector 132. The fiber optic connectors 130, 132 and 134 are shown pre-installed with their respective connector mounts 120, 140 and 150. Excess length of the fibers 161, 162 can be routed at the loop storage region 104. The tray portion 102 can include openings 163 for allowing the optical fibers 160-162 to be routed in/out of the fiber loop-storage region 104.

With the optical fiber pre-routed on the insert and with the fiber optic connectors pre-installed at their respective connector mounting locations, the second connector mount 140 is moved to the retracted position and secured in the retracted position through engagement with the retainer 146 as shown at FIG. 12. The insert 100 is then inserted through the second in-line end 148 of the housing 40 and moved linearly through the main body section 42 along the main axis 44. During the insertion process, the second connector mount 140 engages the release member 148 and is moved out of engagement with their retainer 146 and allowed to automatically extend by the resiliency of the arm 142 into the branch section 50. In the inserted configuration with the connector mounts extended, the connector 130 is positioned outside the first in-line end 46 of the housing 40, the connector 132 is positioned outside the offset end 52 of the housing 40, and the connector 134 is positioned outside the second in-line end 48 of the housing 40. Next the connector 134 is inserted into the interconnector port 62 of the fiber optic adapter 58 and the plate 72 is installed at the second in-line end 48. Thereafter, the connector 130 is inserted into the inner connector port 62 of the fiber optic adapter 54 and the first plate 70 is installed at the first in-line end 46 of the housing 40. During the plate installation process, the resiliency of the connector mount 120 allows the fiber optic connector 130 to be pressed inwardly into the housing 40. Finally, the connector 132 is installed in the inner port 62 of the second fiber optic adapter 56 and the third plate 74 is bonded to the offset end 52 of the housing 40. The resiliency of the arm 142 allows the connector 132 to move into the housing 40 as the third plate 74 is moved toward the offset end 52.

Figure 17:
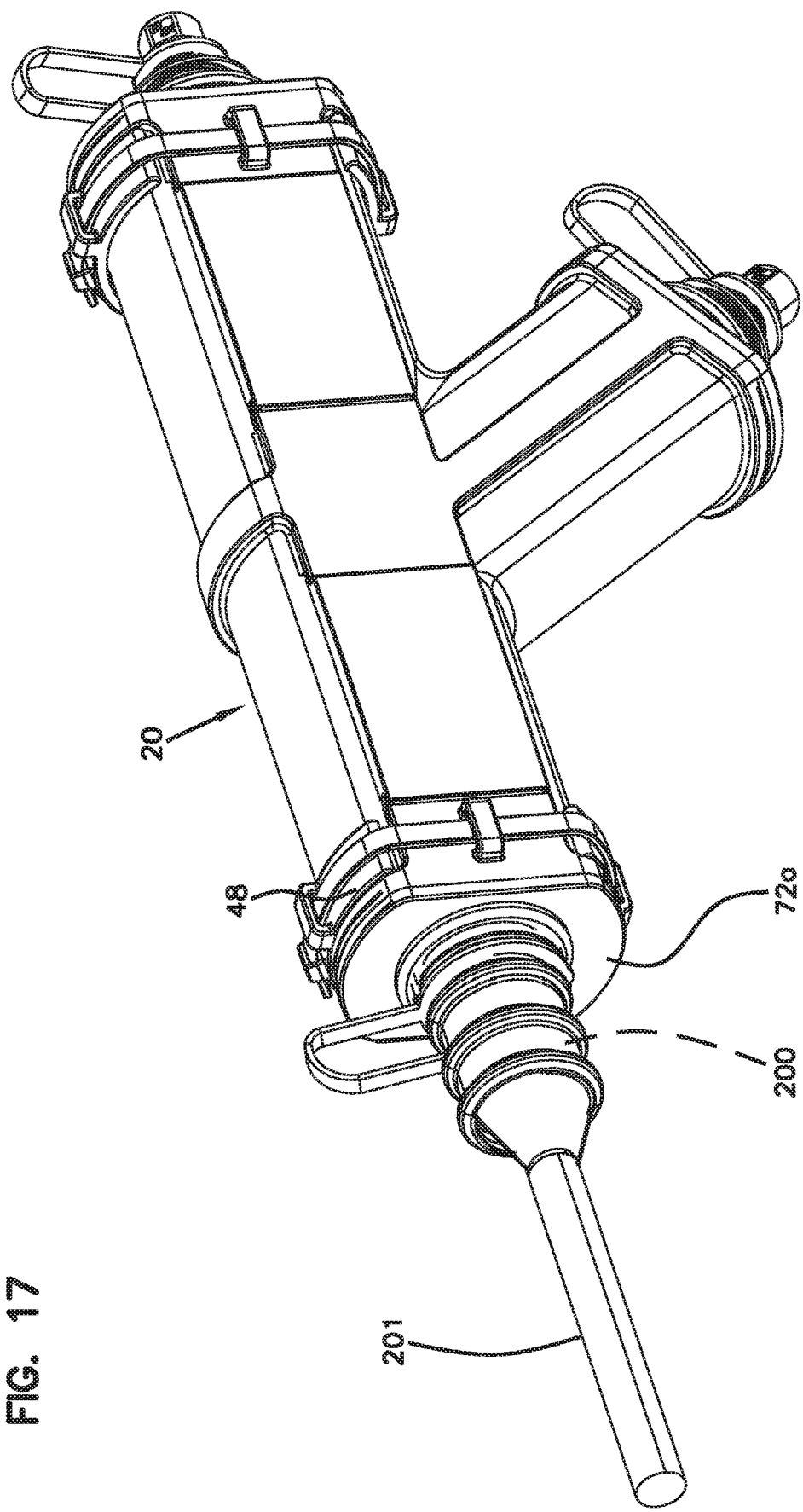
FIG. 17 is a front perspective view of another telecommunications enclosure in accordance with the principles of the present disclosure.
Figure 18:
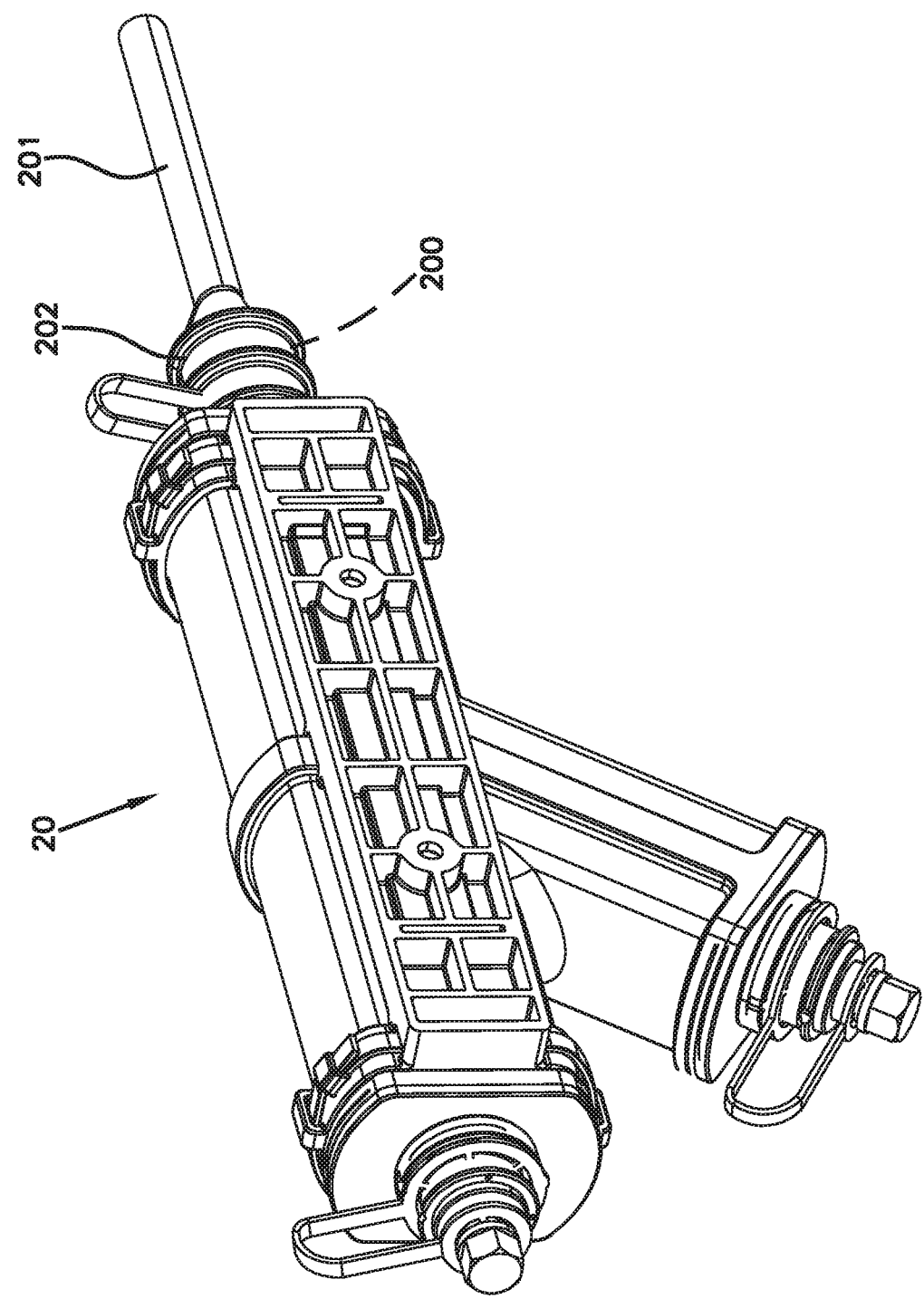
FIG. 18 is a rear perspective view of the telecommunications enclosure of FIG. 17.
Figure 19:
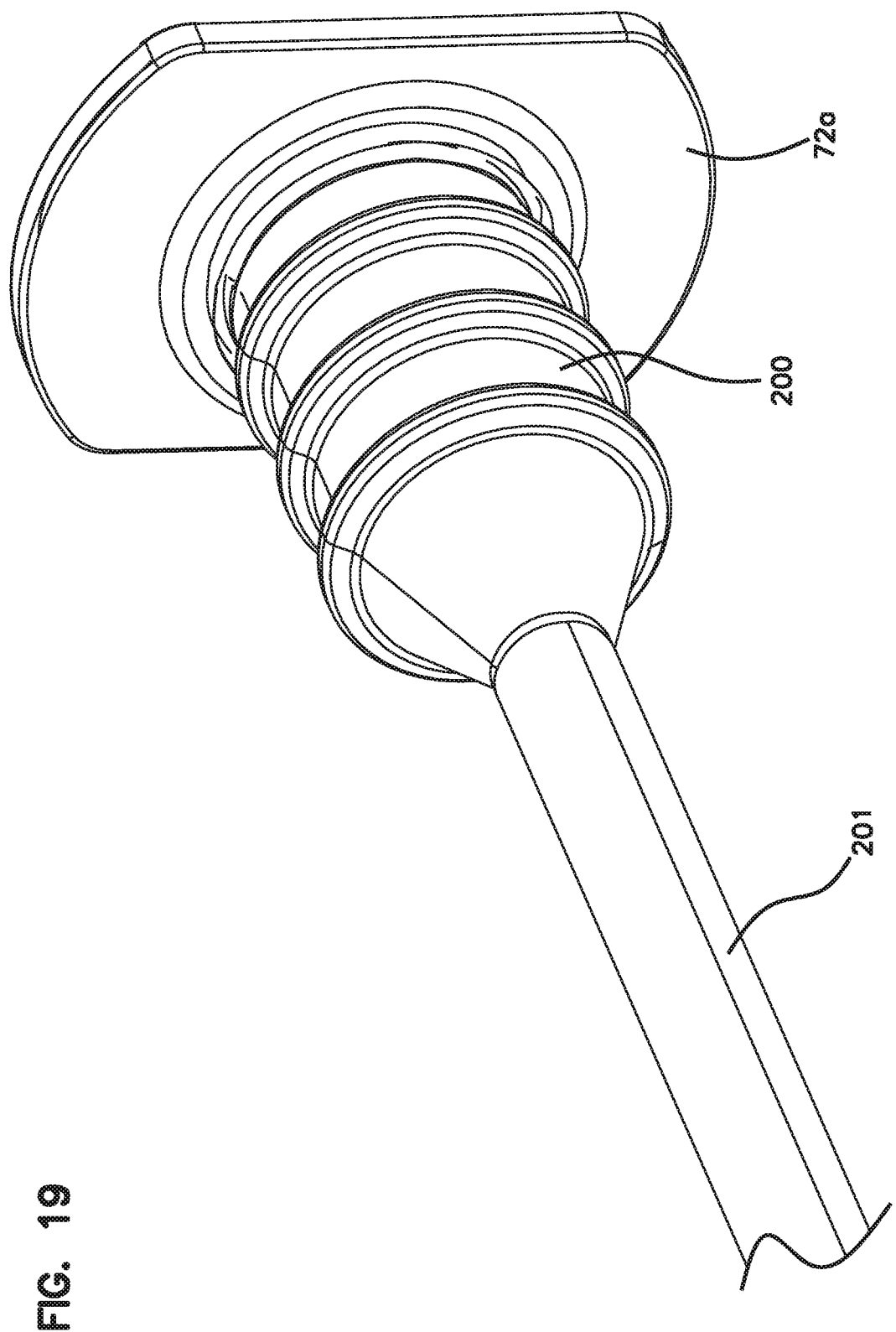
FIG. 19 is a perspective view of a cable attachment plate that is part of the telecommunications enclosure of FIGS. 17 and 18.

As previously indicated, in an alternative example, the second plate 72 coupled to the third fiber optic adapter 58 can be replaced with a plate 72a having a cable attachment location 200 (see FIGS. 17 and 18). A cable 201 is shown secured to the attachment location 200 by a cable affixing sleeve 202 such as a shape-memory sleeve or an overmolded sleeve. In other examples, the cable can be clamped or otherwise secured in place. The plate can be bonded to the second in-line end 48. Optical fibers of the cable can be routed through the plate 72a into the interior of the enclosure. The cable 201 can form a stub cable or tether cable having one end attached to the enclosure 20 and an opposite end being connectorized. The optical fiber or fibers of the tether cable can be coupled to the input side of an internal device. Optical fibers of a multi-fiber cable can also be routed in an indexing configuration as previously described.

Figure 23:
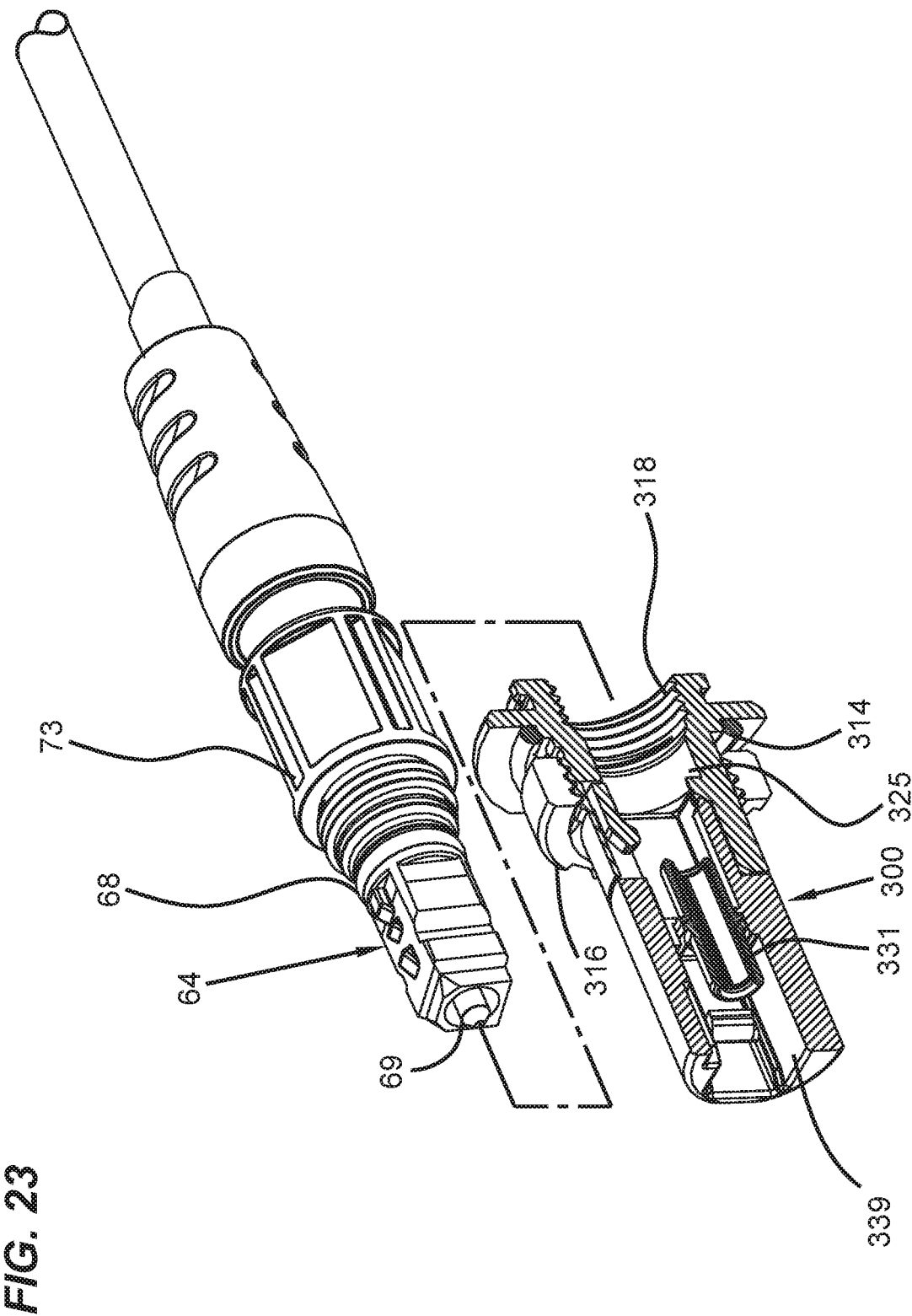
FIG. 23 depicts a hardened fiber optic adapter and mating hardened fiber optic connector suitable for use with telecommunications enclosures in accordance with the principles of the present disclosure.

FIG. 23 shows an example configuration for a hardened fiber optic adapter 300 that is one example of a way to define hardened ports in any of the enclosures disclosed herein. The adapter 300 is adapted to be mounted in sealed relation relative to a housing of an enclosure. For example, seal 314 can seal against the outside of a mounting plate (e.g., any of plates 70, 72 or 74) of the enclosure and nut 316 can be used to secure the adapter 300 within an opening in the mounting plate. The hardened fiber optic adapter includes an outer port 318 for receiving a hardened fiber optic connector such as the connector 64. Either the adapter 300 or the connector 64 preferably has a seal for providing environmental sealing between the adapter 300 and the connector 64 when the connector 64 is inserted in the outer port 318. As depicted, the connector 64 includes seal 68 that seals against a sealing surface 324 of the outer port 318 when the connector 64 is inserted therein. The connector 64 also includes twist-to-secure fastener 73 (e.g., a threaded fastener, a bayonet-style fastener or other structure) that interlocks with a corresponding twist-to-secure fastening arrangement (e.g., threads or bayonet configuration) provided on the adapter 300 to secure the connector 64 within the outer port 318. The adapter 300 also includes internal alignment sleeve 330 for aligning ferrule 69 of the optical connector 64 with a ferrule of a fiber optic connector (e.g., any of connectors 130, 132 or 134) that is loaded within an internal port 339 (e.g., a port that is inside the housing of the enclosure) of the adapter 300. In this way, when the connectors are loaded in their respective ports, their ferrules are aligned and an optical connection is made between optical fibers supported by the ferrules.

Figure 24:
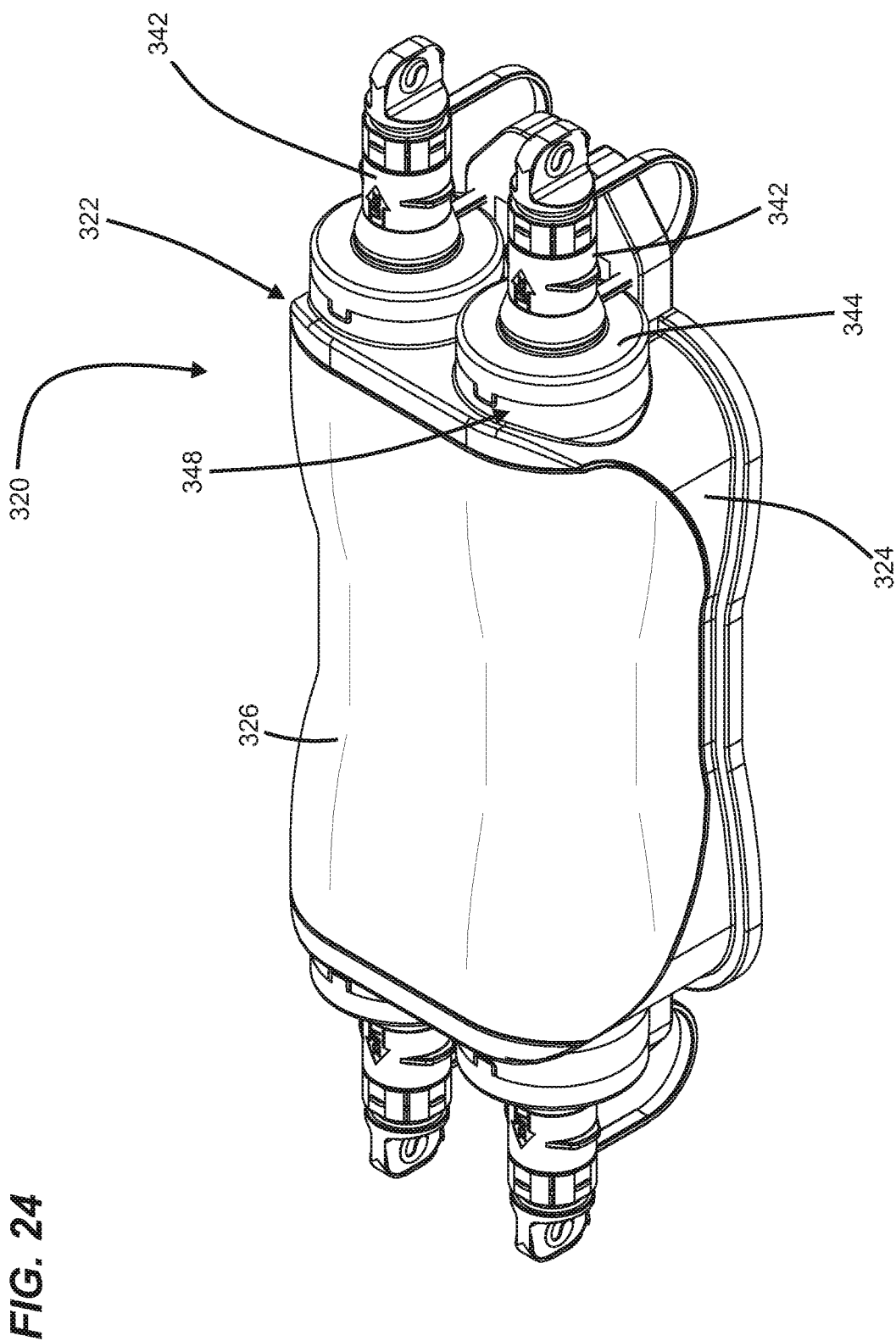
FIG. 24 is a front, end perspective view of another telecommunications enclosure in accordance with the principles of the present disclosure.
Figure 25:
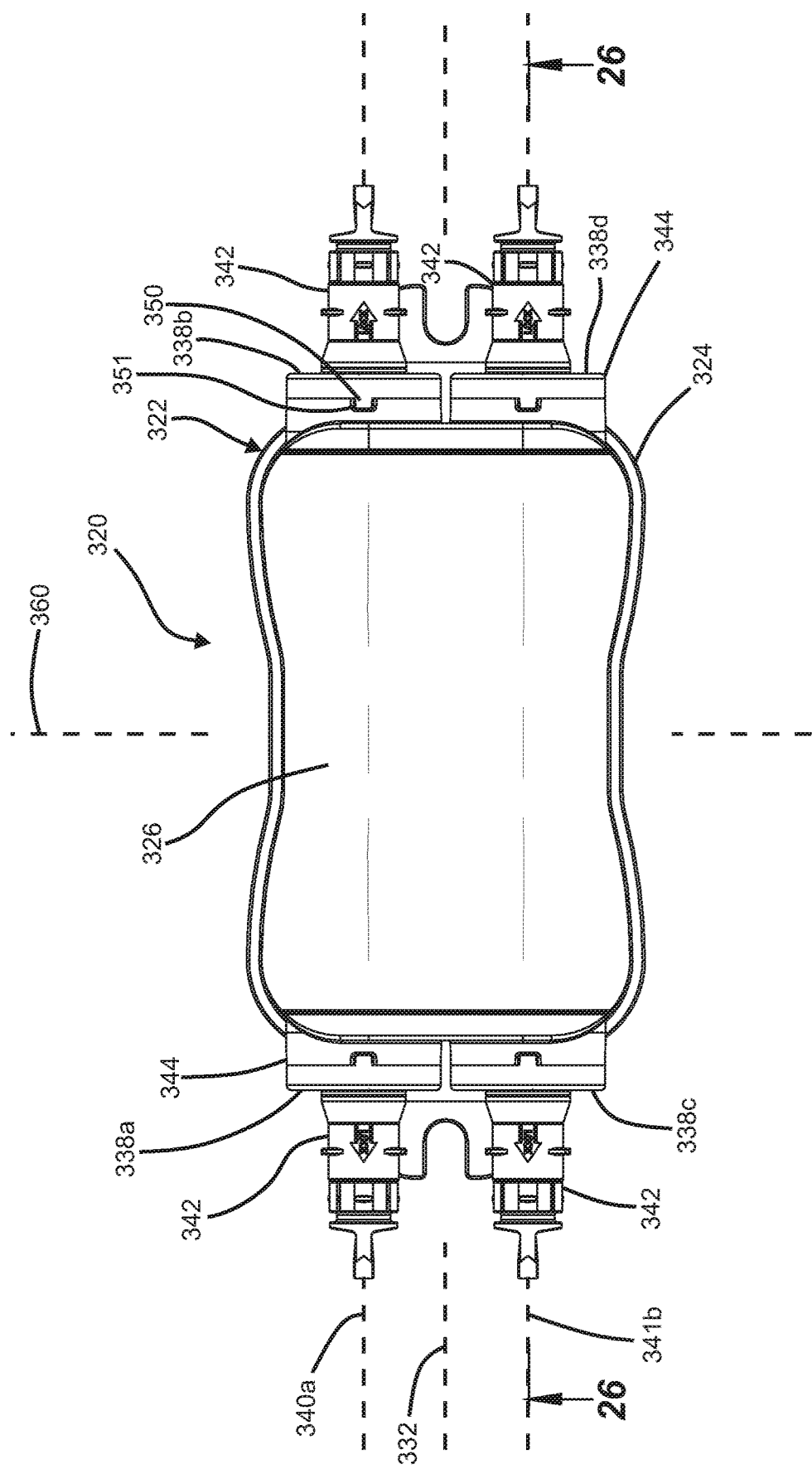
FIG. 25 is a front view of the telecommunications enclosure of FIG. 24.
Figure 26:
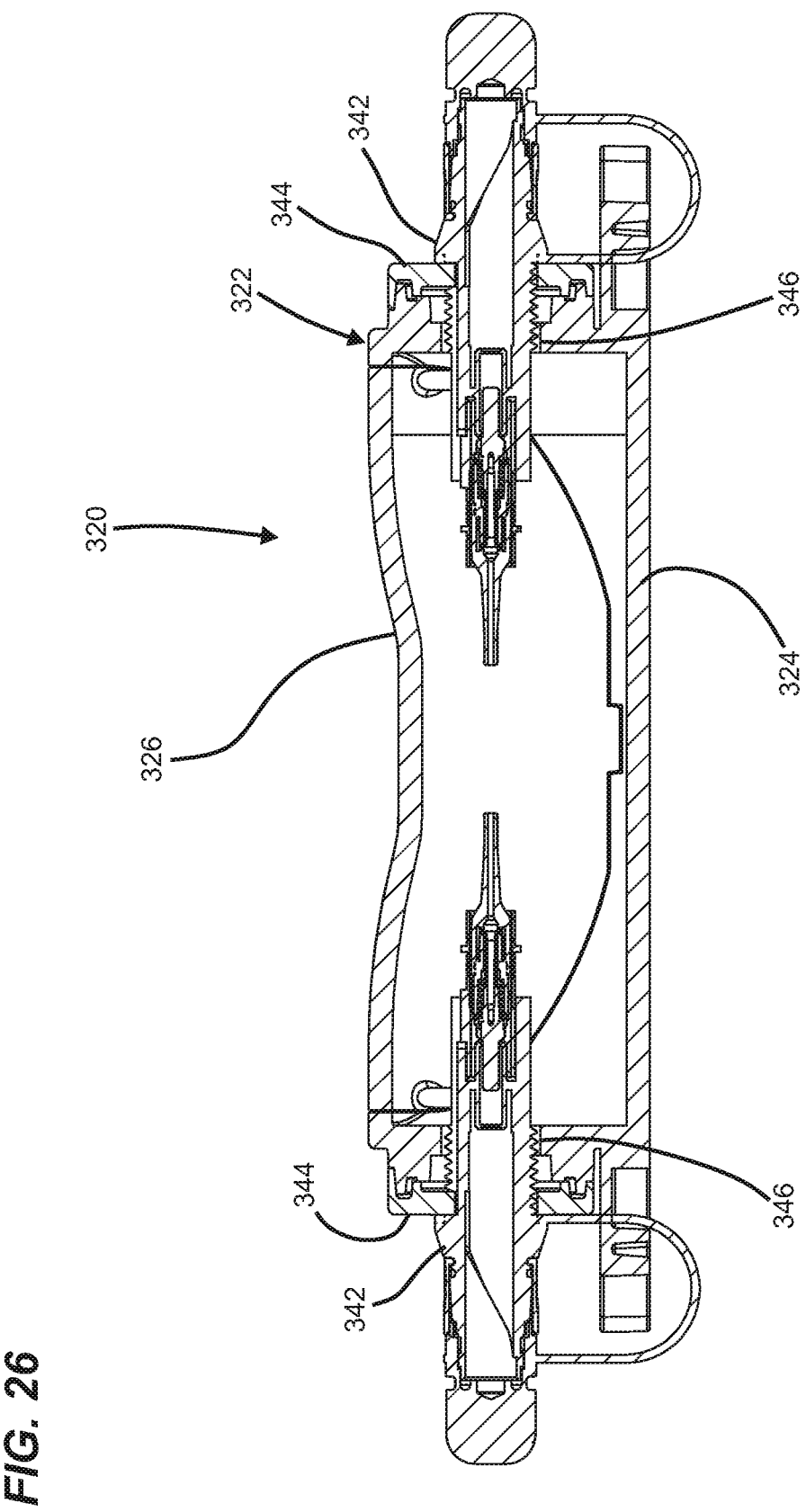
FIG. 26 is a cross sectional view of the telecommunications enclosure of FIG. 24 taken along section line 26-26 of FIG. 24.
Figure 27:
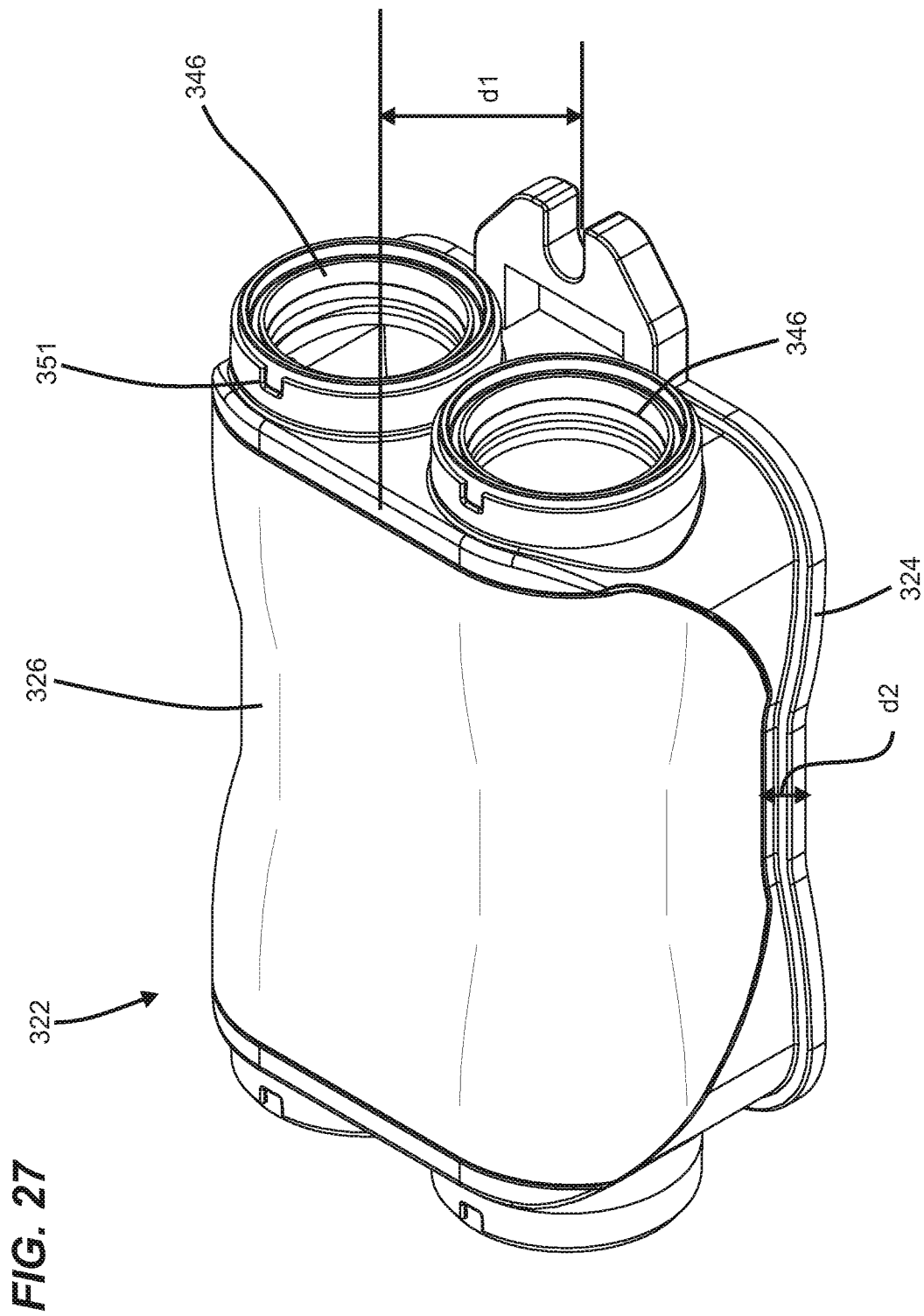
FIG. 27 is a front, end perspective view of a housing of the telecommunications enclosure of FIG. 24 with fiber optic adapter mounting plates removed from cable port locations of the housing.
Figure 28:
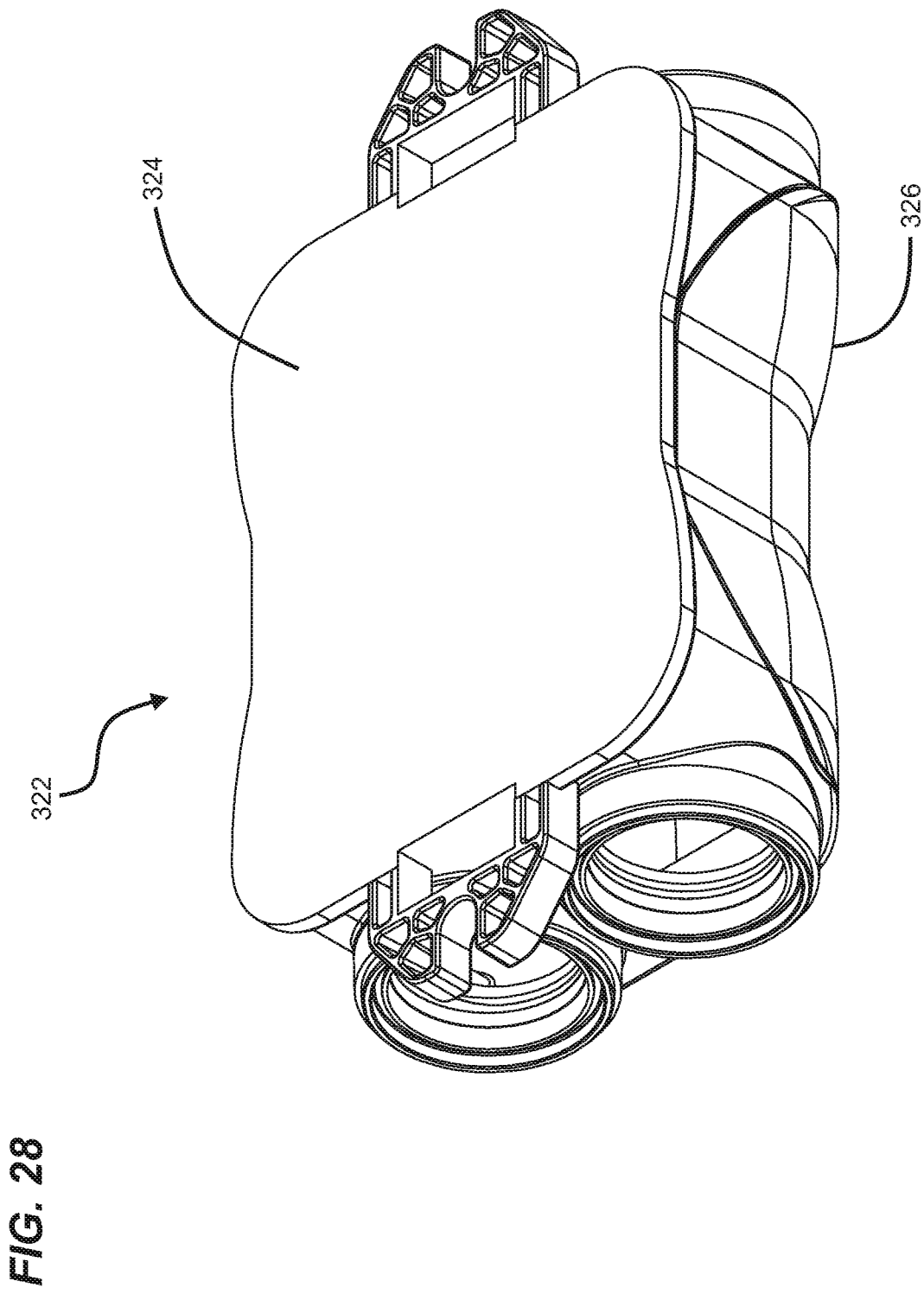
FIG. 28 is a back, end perspective view of the housing of FIG. 27.
Figure 33:
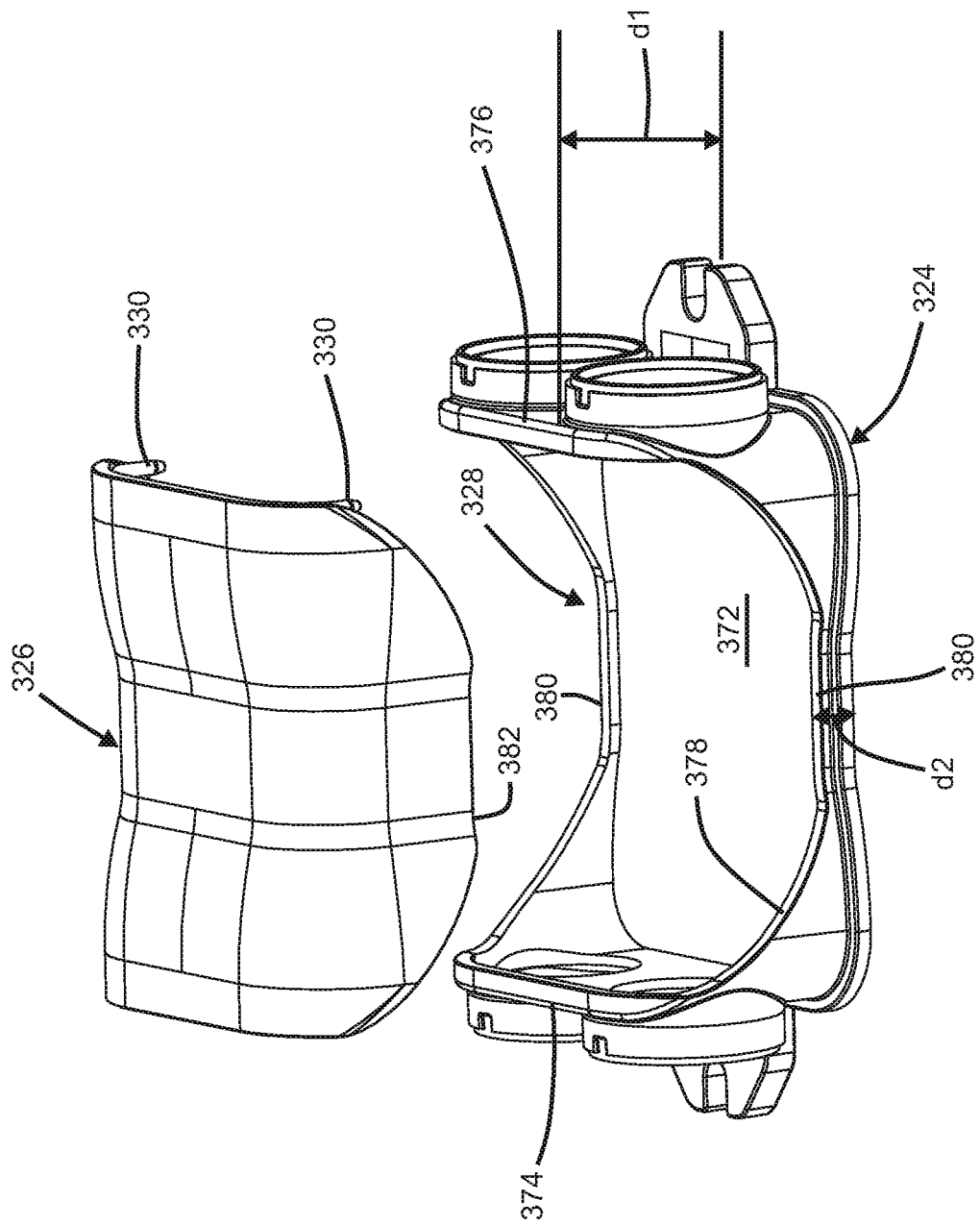
FIG. 33 is a front, exploded view of the housing of FIG. 27.
Figure 34:
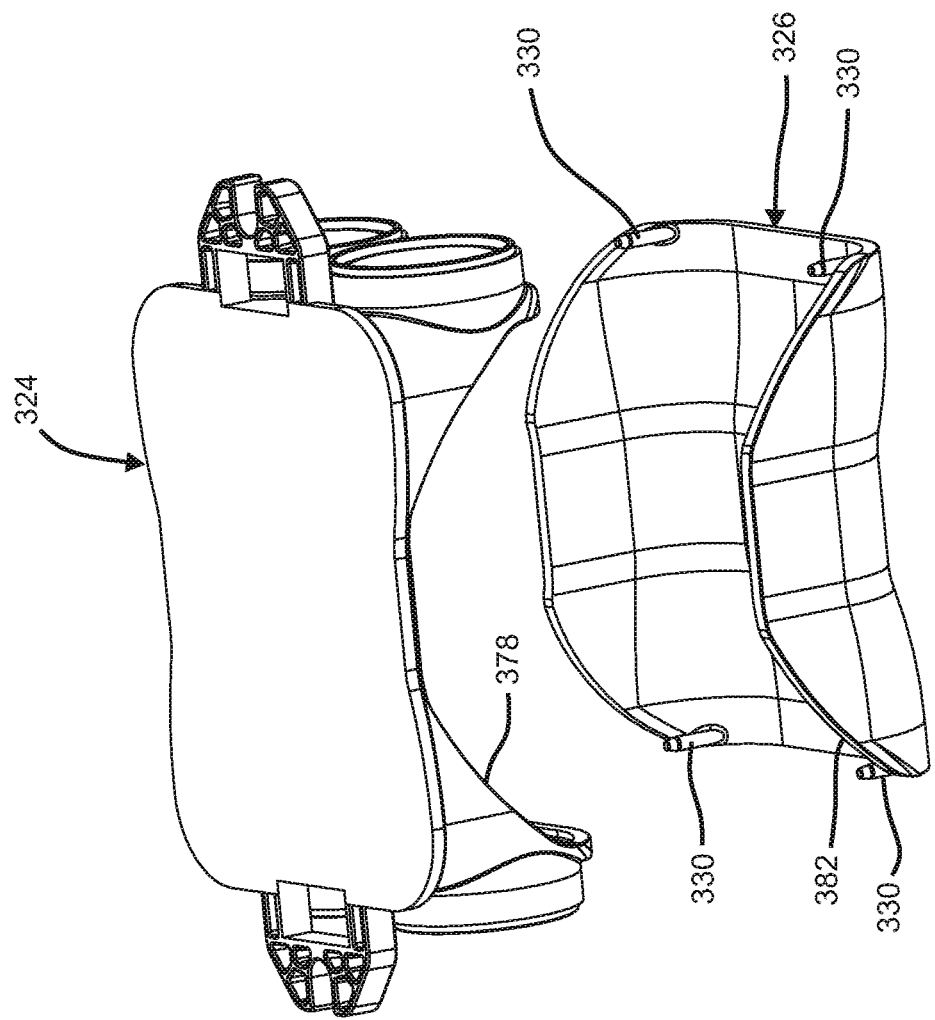
FIG. 34 is rear, exploded view of the housing of FIG. 27.

FIGS. 24-26 depict another telecommunications enclosure 320 in accordance with the principles of the present disclosure. The telecommunications enclosure 320 includes a housing 322 (see FIGS. 27-34) having a configuration that facilitates configuring an internal optical architecture of the enclosure 320 at least when the telecommunications enclosure 320 is initially being manufactured/assembled. The housing 322 includes a base 324 and a front cover 326. As shown at FIGS. 33 and 34, the base 324 includes an enlarged front opening 328 for providing front and side access to an interior of the base 324. The front cover 326 has a shape that complements the shape of the front opening 328. In one example, the front cover 326 mounts over the front opening 328 and is bonded to the base 324 using a bonding technique of the type previously described. In certain examples, the front cover 326 and the front opening 328 can have matching perimeter shapes. In certain examples, the front cover 326 can have a saddle-shaped configuration. In certain examples, the front cover 326 and the base 324 can have edges with mating, complementary profiles (e.g., a mating tongue and groove configuration) for facilitating bonding the base 324 and the front cover 326 together. In certain examples, the bonding interface can include a strength seal having a thermoplastic bonding material including magnetically active particles to activate the strength seal. In certain examples, the front cover 326 can include rear posts 330 that project through the front opening 328 when the front cover 326 is mounted over the front opening 328.

Figure 29:
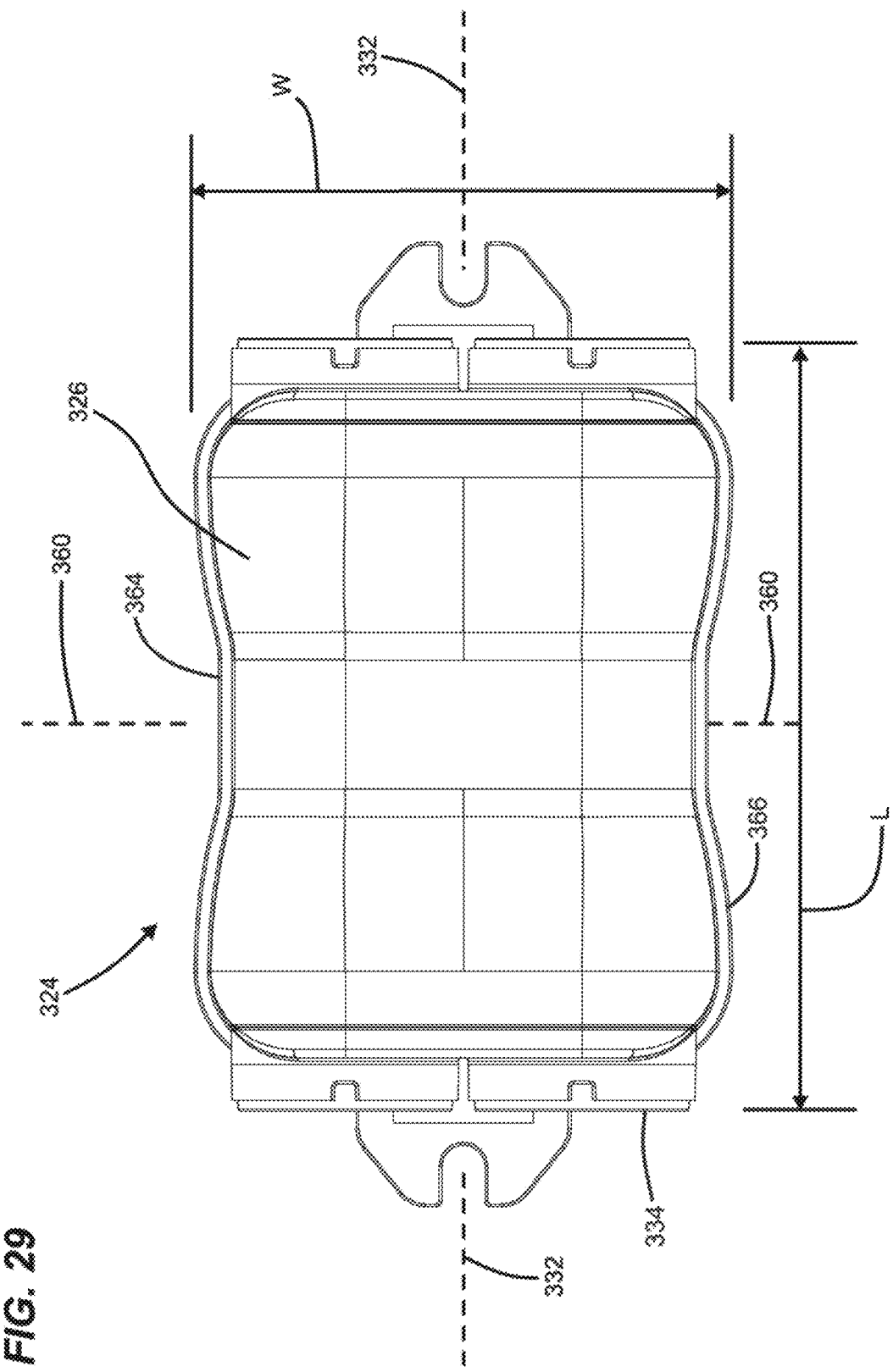
FIG. 29 is a front view of the housing of FIG. 27.
Figure 30:
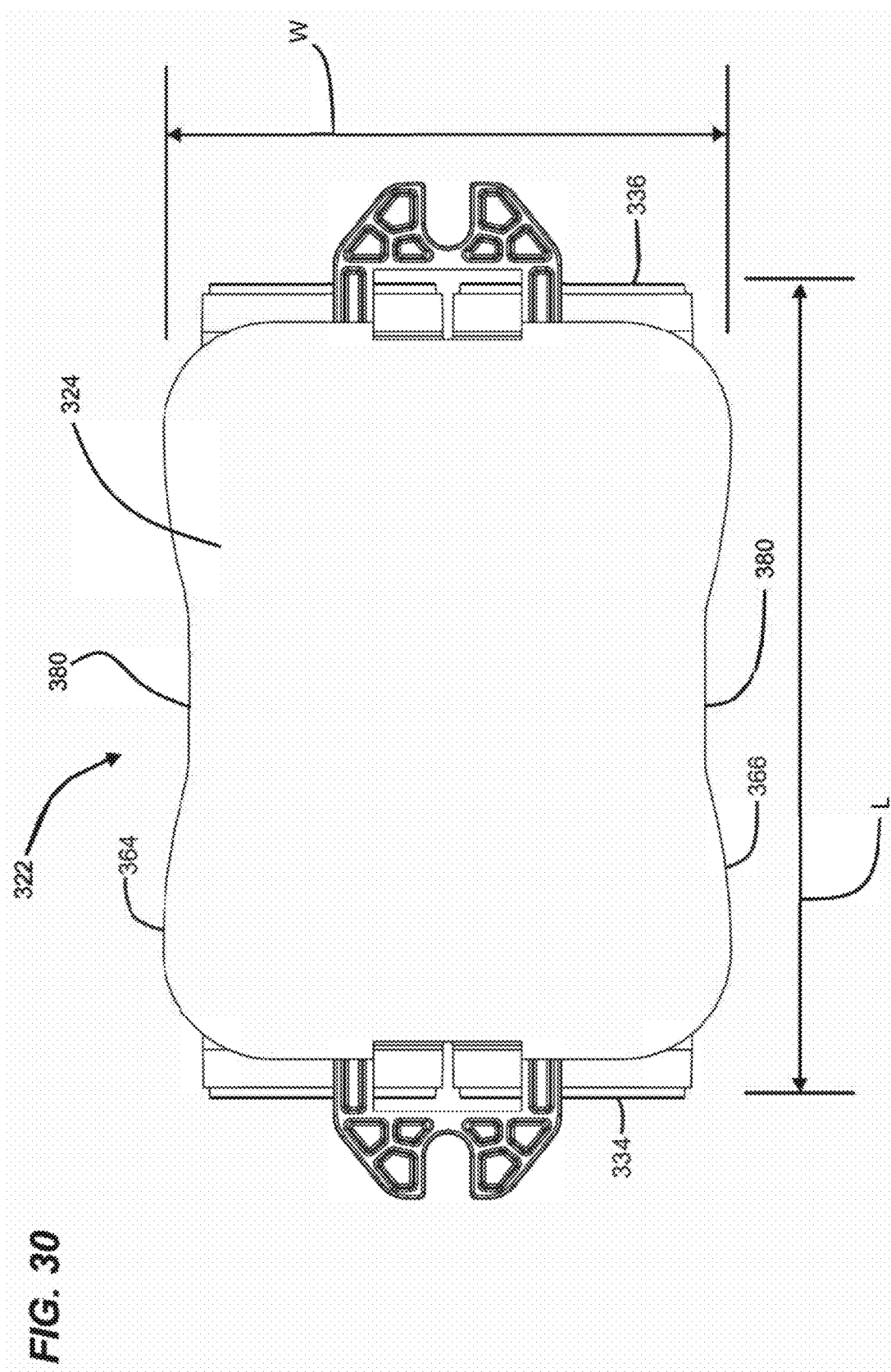
FIG. 30 is a rear view of the housing of FIG. 27.
Figure 31:
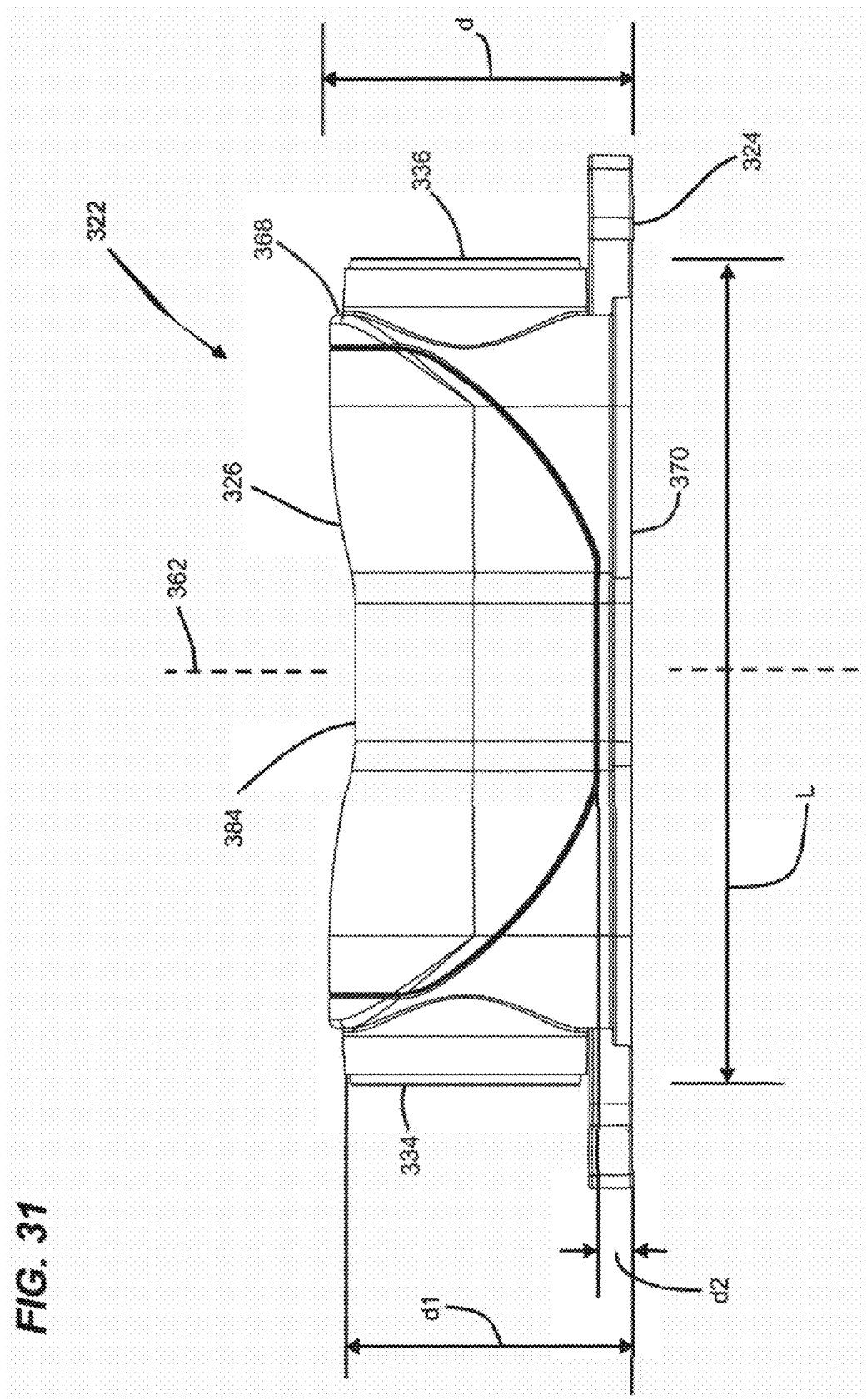
FIG. 31 is a side view of the housing of FIG. 27.

The base 324 and the front cover 326 cooperate to define a main body of the housing 322. The main body of the housing 322 includes a length L that extends along a first axis 332. The length L is best shown at FIGS. 29-31. The main body of the housing 322 includes first and second opposite ends 334, 336 separated by the length L. The telecommunications enclosure 320 preferably includes at least one cable port location located at each of the first and second ends 334, 336. Cable port locations include locations where fiber optic cables can optically connect to the interior of the housing 322, or pass through a wall of the housing 322 into the interior of the housing 322. Example port locations can include structures such as hardened fiber optic adapters, cable attachment locations optionally including shape-memory sleeves, and sealed openings including sealant material such as gel for sealing a location where a fiber optic cable enters/exits the housing 322. In other examples, one or more of the port locations can include stub cables having free ends connectorized by hardened single fiber or multi-fiber optical connectors.

In the depicted example of FIG. 24, the telecommunications enclosure 320 has four cable port locations which include a first cable port location 338a located at the first end 334, a second cable port location 338b located at the second end 336, a third cable port location 338c located at the first end 334, and a fourth cable port location 338d located at the second end 336. The first and second cable port locations 338a, 338b are coaxially aligned with respect to one another along a first cable port axis 340a, and the third and fourth cable port locations 338c, 338d are coaxially aligned with another along a second cable port axis 340b. The first and second cable port axes 340a, 340b are parallel with respect to the first axis 332 and with respect to one another. Additionally, the first and second cable port axes 340a, 340b are positioned on opposite sides of the first axis 332.

Referring to FIGS. 24-26, each of the cable port locations 338a-338d includes a hardened fiber optic adapter 342 mounted within an opening of a mounting plate 344. The mounting plates 344 are adapted to be bonded to the housing 322 at locations where the mounting plates 344 cover cable access openings 346 defined through the housing 322. In the depicted example, the mounting plates 344 and the cable access openings 346 are each circular in shape. In certain examples, a keying arrangement 348 can be defined between each mounting plate 344 and the housing 322, such that the mounting plates 344 can only be mounted in predetermined rotational orientations relative to their corresponding cable access openings 346. In the depicted example, each mounting plate 344 defines a key 350 that fits within a corresponding keyway 351 defined by the housing 322 adjacent each of the cable access openings 346. It will be appreciated that the mounting plates 344 can be bonded to the housing 322 using any of the bonding techniques previously described herein. In a preferred example, strength seals are used to secure the mounting plates 344 to the housing 322.

Referring to FIG. 26, each of the hardened fiber optic adapters 342 includes a hardened outer port 352 for receiving a hardened fiber optic connector from outside the enclosure 320. Each of the hardened fiber optic adapters 342 also includes a ferrule assembly 354 having an internal ferrule 355 mounted within an adapter body of the hardened fiber optic adapter 342. When a hardened fiber optic connector is inserted within one of hardened outer ports 352, a corresponding ferrule of the hardened fiber optic connector is aligned with the internal ferrule 355 to provide an optical connection. In certain examples, the hardened fiber optic adapter 342 can be configured to accommodate single-fiber optical connectors, or alternatively, can be configured to accommodate multi-fiber optical connectors. The internal ferrules 355 preferably terminate the ends of optical fibers that are routed within the interior of the housing 322. The internal optical fibers can be routed to optical components (e.g., asymmetric optical power splitters, symmetric optical power splitters, wavelength division multiplexers, or the like) within the housing 322, or can be routed between ferrules 355 corresponding to different ones of the cable port locations 338a-338d.

Figure 32:
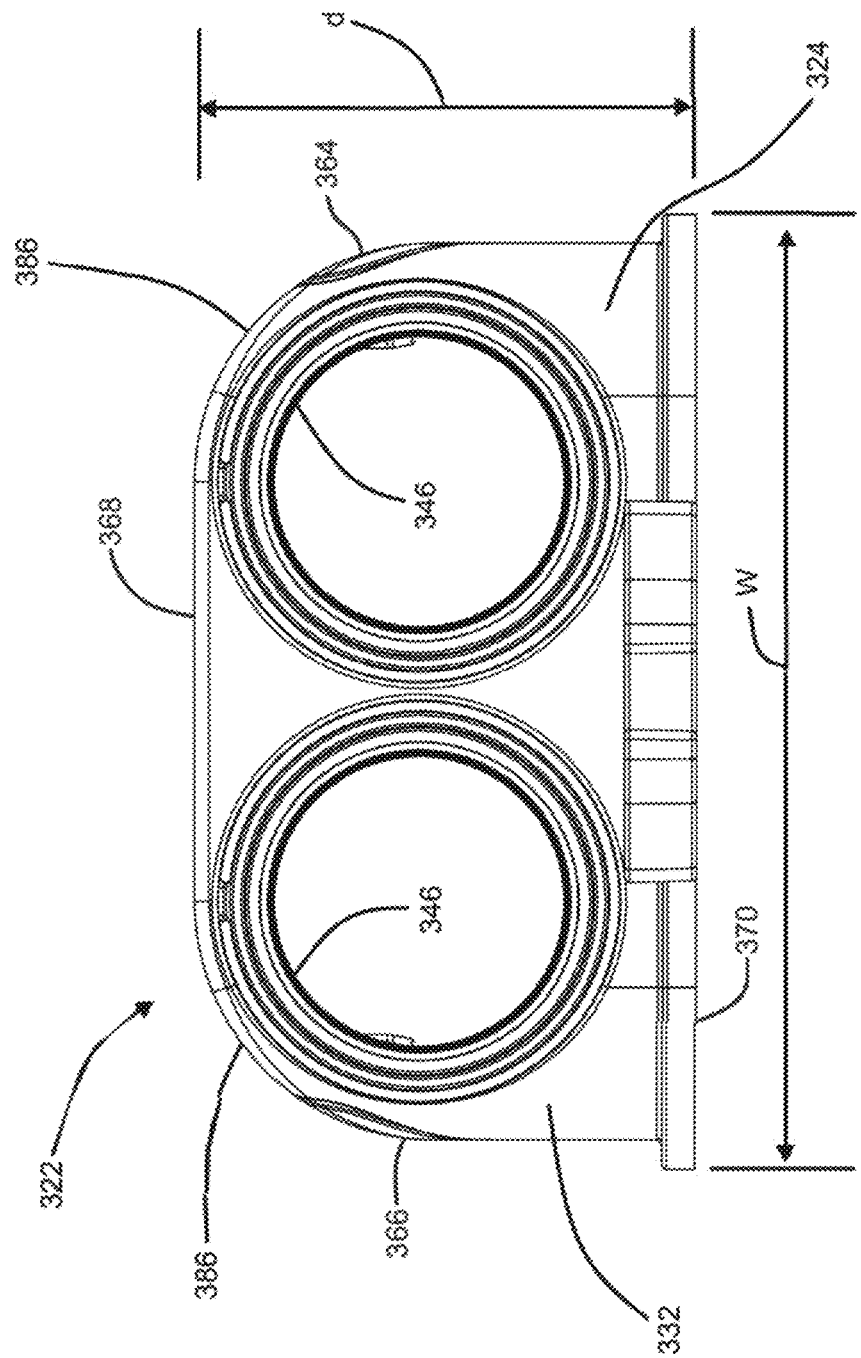
FIG. 32 is an end view of the housing of FIG. 27.

Referring to FIGS. 29, 30, and 32, the housing 322 includes a width W that extends along a second axis 360 that is perpendicular with respect to the first axis 332. The housing 322 also includes a depth D (see FIGS. 31 and 32) that extends along a third axis 362 that in perpendicular with respect to the first and second axes 332 and 360. The first and second ends 334, 336 of the housing 322 are separated by the length L of housing 322. The housing also includes first and second opposite sides 364, 366 separated by the width W. Additionally, the housing includes a front 368 and back 370 separated by the depth D.

Referring to FIGS. 33 and 34, the base 324 has a rear wall 372 that defines the back 370 of the housing 322. The base 324 also includes first and second opposite end walls 374, 376 that project forwardly from the rear wall and respectively define the first and second ends 334, 336 of the housing 322. The base 324 includes a front edge 378 which extends around and defines the front opening 328 of the base 324. The front edge 378 is defined by the first and second end walls 374, 376 along the width W of the housing 322 adjacent the first and second opposite ends 334, 336 of the housing 322. The front edge 378 also extends along the length L of the housing 322 adjacent the first opposite sides 364, 366 of the housing 322. The front edge 378 defines a first depth dimension D1 with respect to the rear wall 372 at the first and second opposite ends 334, 336 of the housing 322. The front edge 378 defines a second depth dimension D2 with respect to the rear wall 372 at the first and second sides 364, 366 of the housing 322. In a preferred example, the first depth dimension D1 is at least three times as large as the second depth dimension D2. In the depicted example, the second depth dimension D2 is defined at a mid region 380 along the length L of the housing 322. It will be appreciated that the front cover 326 has a rear edge 382 adapted to engage and mate with the front edge 378. Preferably, both the front edge 378 and the rear edge 382 are adapted to extend about a full perimeter of the front opening 328 and have matching, complementary contours. It will be appreciated that with the front cover 326 disengaged from the base 324, optical fibers can be readily routed within the interior of the base 324 and optical components can be positioned within the base. In certain examples, optical fibers can be arranged in slack storage areas and optical fibers can be routed to ferrule assemblies 354 corresponding to the hardened fiber optic adapters 342. Typically, the fiber routing and component positioning takes place during manufacture of the telecommunications enclosure 320 to provide the optical architecture within the enclosure 320.

Once the optical architecture has been established within the enclosure 320, the front cover 326 can be bonded to the base 324 such that the front cover 326 covers the front opening 328. In certain examples, the front edge 378 and the rear edge 382 having mating profiles (e.g., tongue and groove configurations) that facilitate bonding the front cover 326 to the base 324 with a strength seal. Preferably, once the front cover 326 is bonded to the base 324, the front cover 326 is not removed from the base 324. However, by using a strength seal with embedded magnetically active particles, it is possible to soften the strength seal through the use of a magnetic field to allow the cover to be removed after initial securement for purposes such as repair or providing upgrades.

In certain examples, the housing 322 is symmetric about both the first axis 332 and the second axis 360. In certain examples, as shown at FIGS. 29 and 30, the first and second opposite sides 364, 366 are concave along the length L of the housing 322 when viewed from the front or back of housing 322, such that the mid region 380 of the housing 322 defines a waist of the housing 322. In certain examples, as shown at FIG. 31, the front cover 326 has a concavity 384 along the length L of the housing 322 when viewed from the first or second side 364, 366 of the housing 322. In certain examples, as shown at FIG. 32, the housing 322 includes convex regions 386 when viewed from the first or second end 332, 334 of the housing 322. Referring back to FIG. 33, the front edge 378 has curved transitions 388 that extend between the first depth dimension D1 and the second depth dimension D2.

Figure 35:
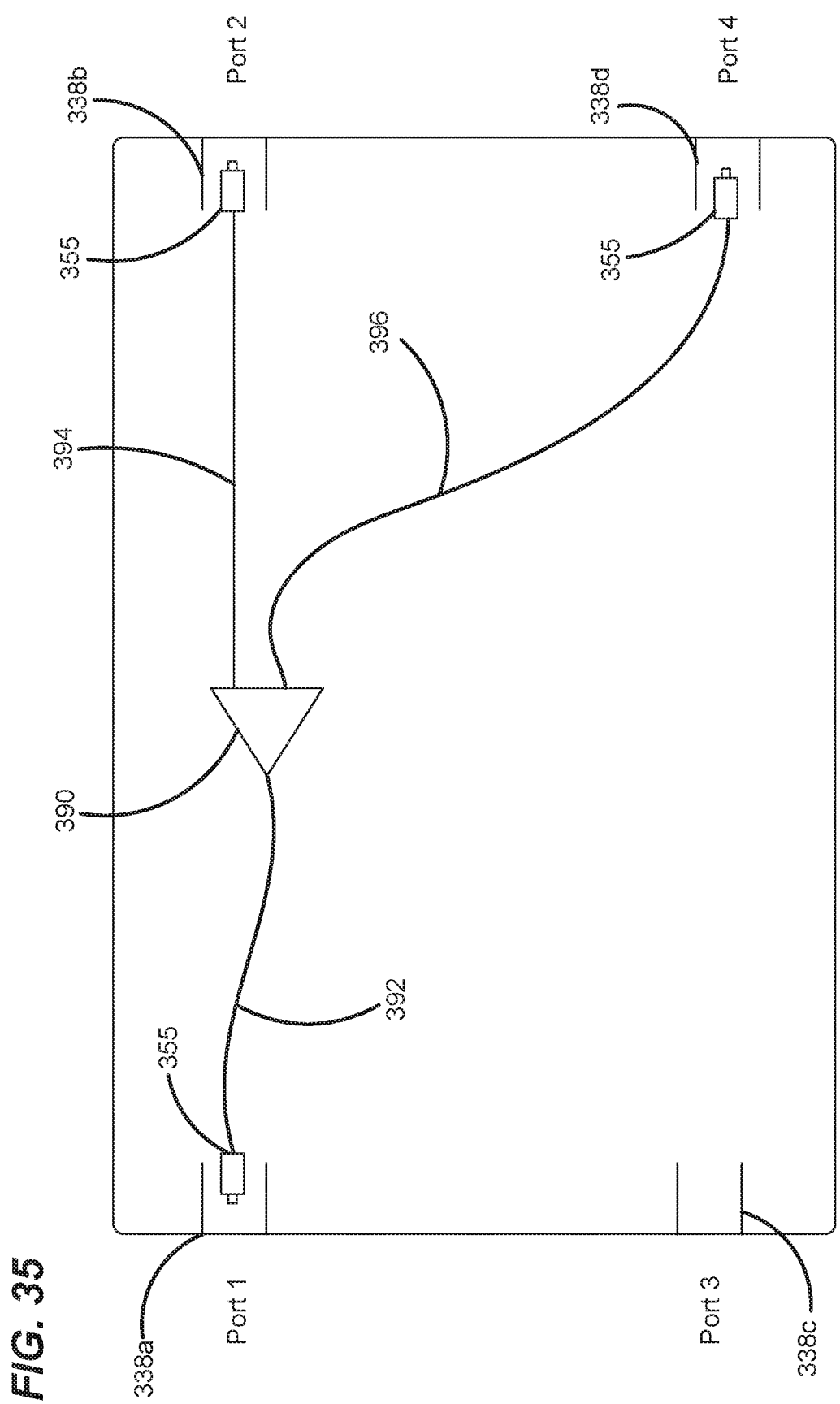
FIG. 35 depicts an example internal fiber optic architecture that can be used with the telecommunications enclosure of FIG. 24.

It will be appreciated that the different types of fiber optic architectures can be incorporated within the housing 322 of the telecommunications enclosure 320. FIG. 35 shows an example fiber optic architecture including an optical component 390 such as a symmetric or an asymmetric passive optical power splitter or a wavelength division multiplexer. An input 392 of the component 390 is optically coupled to an internal ferrule 355 corresponding to the first cable port location 338a. A pass-through optical line optically couples an output of the component 390 to the internal ferrule 355 of the second cable port location 338b, and a drop line 396 optically connects an output of the component 390 to the internal ferrule 355 of the fourth cable port location 338d. It will be appreciated that the component 390 can be configured to tap a portion of the power of an optical signal being transmitted between the first and second cable port locations 338a, 338b and route the tapped portion to the fourth cable port location 338d. In the case of a wavelength division multiplexer, one or more wavelengths are filtered from the main signal and directed through the drop line 396. In the case of an asymmetric passive power splitter, a smaller portion of the power of the optical signal being transmitted between the cable port locations 338a, 338b is tapped and forwarded to the fourth cable port location 338d. In certain examples, the third cable port location 338c can be used for upgrades or expansion.

Figure 36:
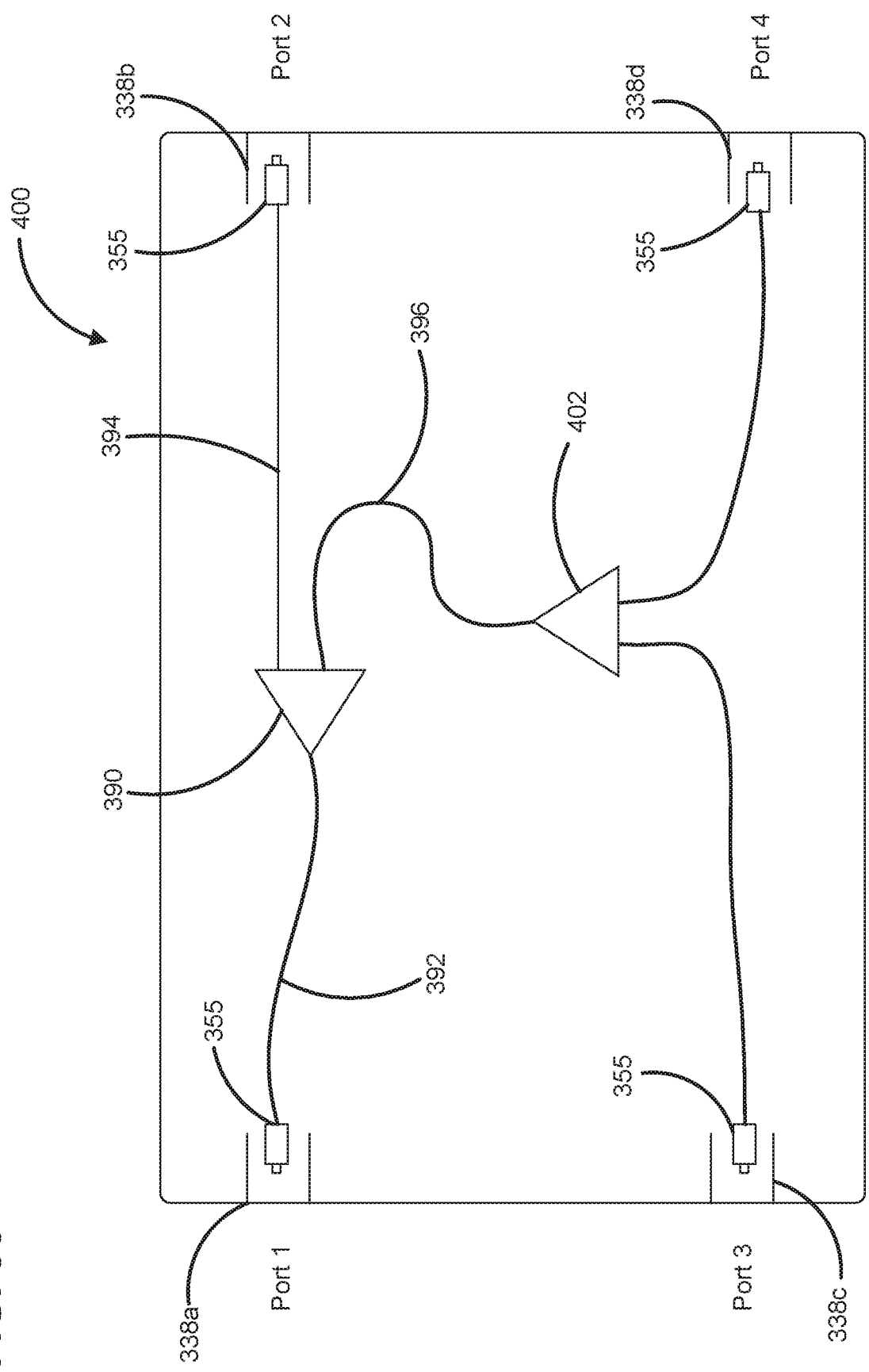
FIG. 36 depicts another internal fiber optic architecture that can be used in combination with the telecommunications enclosure of FIG. 24.

FIG. 36 depicts another architecture similar to the architecture of FIG. 35 except a passive optical power splitter 402 has been provided for splitting the signal carried by the drop line 396 and directing the signal to each of the third and fourth cable port locations 338c, 338d.

Figure 37:
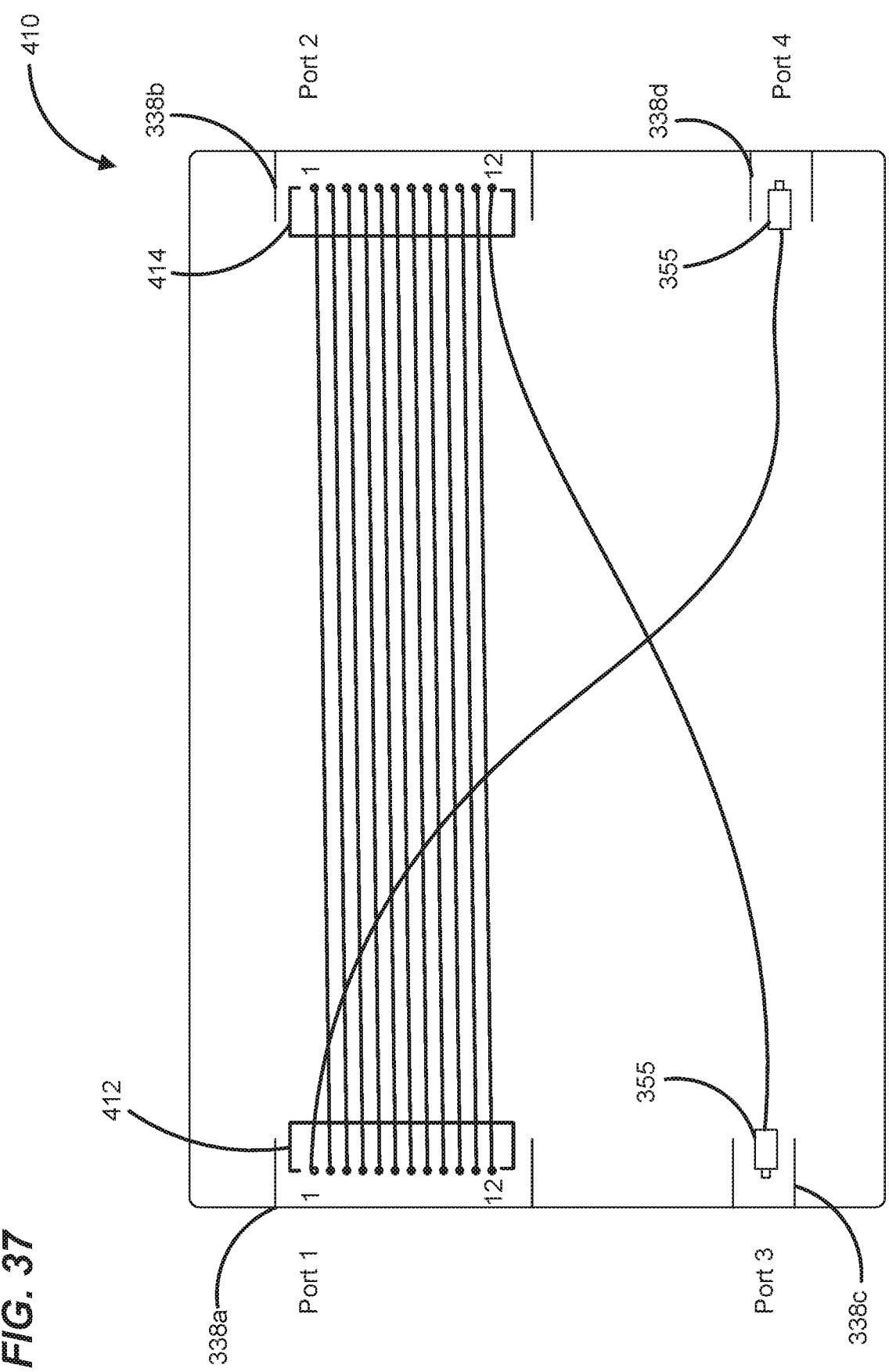
FIG. 37 depicts still another internal fiber optic architecture that can be used with the telecommunications enclosure of FIG. 24.
Figure 38:
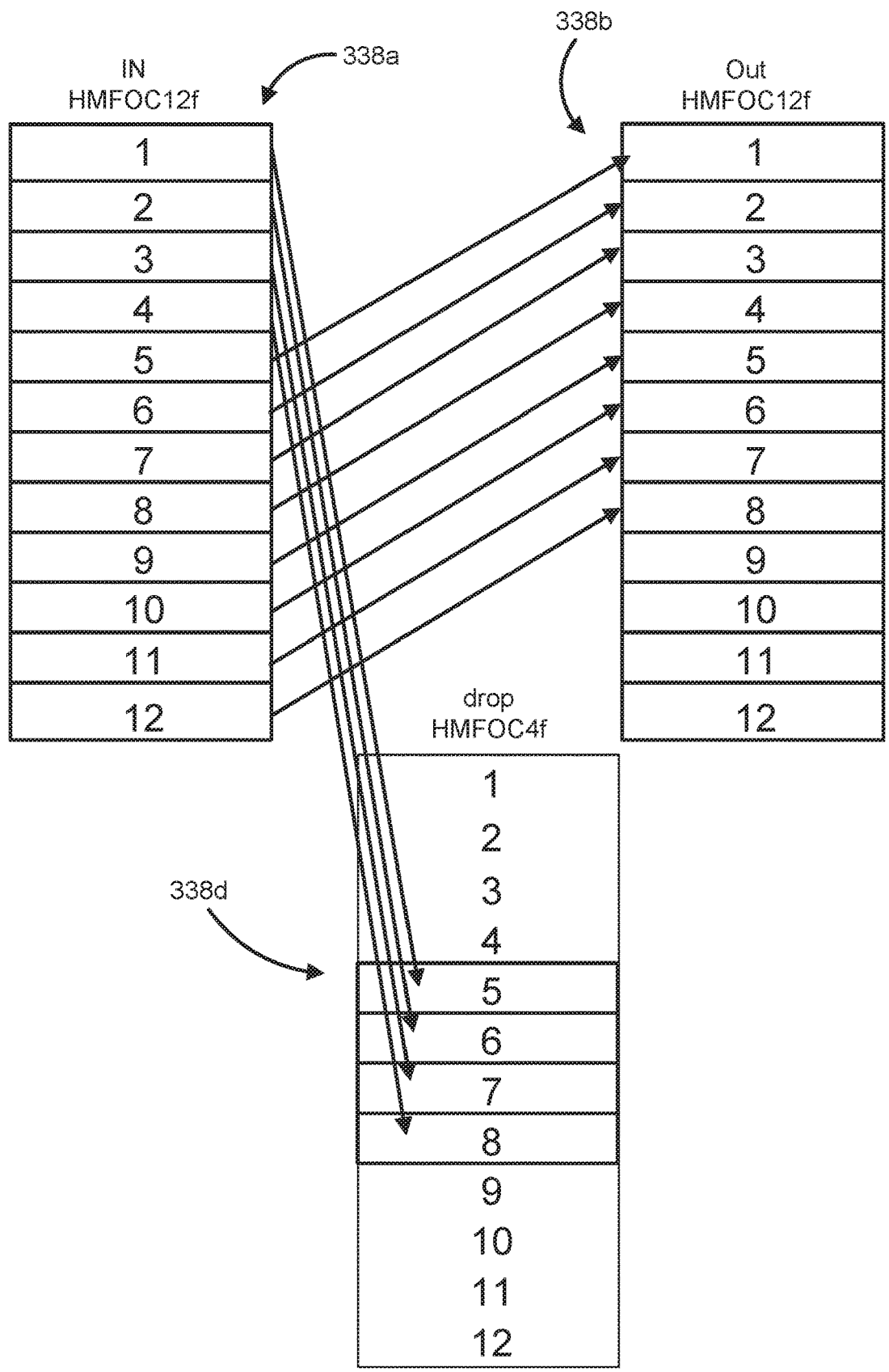
FIG. 38 depicts still another internal fiber optic architecture that can be used with the telecommunications enclosure of FIG. 24.

FIG. 37 shows an example fiber optic architecture 410 having an indexing configuration in which optical fibers are indexed from a multi-fiber ferrule 412 at the first cable port location 338a to a multi-fiber ferrule 414 at the second cable port location 338b. A first fiber position of the ferrule 412 is optically connected to the fourth cable port location 338d by a drop line (e.g., an optical fiber) and a last fiber position of the ferrule 414 is optically connected to the third cable port location 338c by a drop line. In another example, multi-fiber ferrules can be provided at the third and fourth port locations 338c, 338d and multiple drops are routed from the first cable port location 338a to the fourth cable port location 338d and multiple drops are routed from the second cable port location 338b to the third cable port location 338c. In such an example, optical fibers indexed between the first cable port location 338a and the second cable port location 338b can be indexed a number of positions equal to the number of optical fibers dropped to the fourth cable port location 338d. In other examples, optical fibers may only be dropped to one of the third or fourth cable port locations 338c, 338d and the other of the cable port locations 338c, 338d can be a blind port available for future use/expansion/upgrades. FIG. 38 depicts an example architecture for an indexing configuration where multiple fibers (e.g., four optical fibers) are dropped from the first cable port location 338a to the fourth cable port location 338d and the third cable port location 338c is unused and available for future use.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

What is claimed is:

1. A telecommunications enclosure comprising:
a housing including a length that extends along a first axis, a width that extends along a second axis perpendicular to the first axis, and a depth that extends along a third axis that is perpendicular to the first and second axes, the housing including first and second opposite ends separated by the length and first and second opposite sides separated by the width, the housing also including a front and a back separated by the depth, wherein the first and second opposite sides are concave along the length of the housing when viewed from the front or back of the housing such that a mid-region of the housing defines a waist of the housing;
the housing including a base having a rear wall that defines the back of the housing, the base also including first and second end walls that project forwardly from the rear wall and define the first and second ends of the housing, the base including a front edge defining a front opening of the base, the front edge being defined by the first and second end walls along the width of the housing adjacent the first and second opposite ends of the housing, the front edge extending along the length of the housing adjacent the first and second opposite sides of the housing, the front edge defining a first depth dimension with respect to the rear wall at the first and second opposite ends of the housing and defining a second depth dimension with respect to the rear wall at the first and second sides of the housing, the first depth dimension being at least 3 times as large as the second depth dimension;
a front cover having a rear edge that is bonded to the front edge of the base; and
at least one cable port location at each of the first and second opposite ends of the housing.

2. The telecommunications enclosure of claim 1, wherein two cable port locations are provided at each of the first and second opposite ends of the housing.

3. The telecommunications enclosure of claim 1, wherein each of the cable port location includes a hardened port for receiving a hardened fiber optic connector.

4. The telecommunications enclosure of claim 3, wherein the hardened ports are defined by hardened fiber optic adapters, wherein the hardened fiber optic adapters are mounted to mounting plates bonded to the first and second end walls, and wherein the mounting plates are keyed and cover cable openings defined by the first and second end walls.

5. The telecommunications enclosure of claim 1, wherein the front cover is saddle-shaped.

6. The telecommunications enclosure of claim 1, wherein the front edge has curved transitions between the first depth dimensions and the second depth dimensions.

7. The telecommunications enclosure of claim 1, wherein the housing is symmetric about the first and second axis.

8. The telecommunications enclosure of claim 1, wherein the front cover is concave along the length of the housing when viewed from the first or second side of the housing.

9. The telecommunications enclosure of claim 1, wherein the housing is convex when viewed from the first or second end of the housing.

10. The telecommunications enclosure of claim 1, wherein the housing contains an asymmetric optical power splitter for tapping a portion of an optical signal routed through the enclosure.

11. The telecommunications enclosure of claim 1, wherein the housing contains a symmetric optical power splitter or a wavelength division multiplexer.

12. The telecommunications enclosure of claim 1, wherein the housing contains an optical indexing architecture.

* * * * *